(12) United States Patent
Zorgui et al.

(10) Patent No.: US 12,484,068 B2
(45) Date of Patent: Nov. 25, 2025

(54) DEACTIVATION OF SEMI-PERSISTENT SCHEDULING AND CONFIGURED GRANT RESOURCES DURING TEMPORARY BANDWIDTH PART SWITCHING

(71) Applicant: QUALCOMM Incorporated, San Diego, CA (US)

(72) Inventors: Marwen Zorgui, San Diego, CA (US); Ahmed Attia Abotabl, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 485 days.

(21) Appl. No.: 17/964,802

(22) Filed: Oct. 12, 2022

(65) Prior Publication Data

US 2024/0129924 A1 Apr. 18, 2024

(51) Int. Cl.
*H04W 72/23* (2023.01)
*H04W 72/044* (2023.01)
*H04W 76/30* (2018.01)

(52) U.S. Cl.
CPC ......... *H04W 72/23* (2023.01); *H04W 72/044* (2013.01); *H04W 76/30* (2018.02)

(58) Field of Classification Search
CPC ... H04W 72/23; H04W 72/044; H04W 72/11; H04W 72/0453; H04W 76/30; H04W 36/06; H04L 5/0098
See application file for complete search history.

(56) References Cited

U.S. PATENT DOCUMENTS

| 11,711,713 | B2* | 7/2023 | Babaei | H04W 72/23 370/329 |
|---|---|---|---|---|
| 12,309,699 | B2* | 5/2025 | Chen | H04W 76/28 |
| 2019/0090299 | A1* | 3/2019 | Ang | H04W 52/0229 |
| 2019/0132092 | A1* | 5/2019 | Chen | H04W 72/23 |

(Continued)

FOREIGN PATENT DOCUMENTS

| CA | 3135030 C * | 7/2023 | H04L 5/001 |
|---|---|---|---|
| CA | 3154162 C * | 10/2023 | H04B 7/0626 |

(Continued)

OTHER PUBLICATIONS

Google Patents translation of Publication of CN115915303A (Year: 2023).*

*Primary Examiner* — Sujoy K Kundu
*Assistant Examiner* — Vladislav Y Agureyev
(74) *Attorney, Agent, or Firm* — Kevin M. Donnelly; Holland & Hart LLP

(57) ABSTRACT

Methods, systems, and devices for wireless communications are described. A user equipment (UE) may receive, via a first bandwidth part, a first downlink control information message activating a semi-persistent resource for the first bandwidth part. The UE may switching to a second bandwidth part from the first bandwidth part for a temporary duration. the UE may delay, based on switching to the second bandwidth part, communications via the semi-persistent resource on the first bandwidth part for the temporary duration without receiving a second downlink control information message via the first bandwidth part that deactivates or releases the semi-persistent resource.

29 Claims, 15 Drawing Sheets

(56) References Cited

U.S. PATENT DOCUMENTS

| | | | |
|---|---|---|---|
| 2019/0149305 A1* | 5/2019 | Zhou | H04L 5/0092 370/330 |
| 2019/0166066 A1* | 5/2019 | Ang | H04L 5/0078 |
| 2019/0215870 A1* | 7/2019 | Babaei | H04L 5/0057 |
| 2019/0222290 A1* | 7/2019 | Ly | H04B 7/0695 |
| 2019/0297577 A1* | 9/2019 | Lin | H04W 52/0235 |
| 2019/0357300 A1* | 11/2019 | Zhou | H04L 5/0094 |
| 2019/0364602 A1* | 11/2019 | Yi | H04W 72/20 |
| 2020/0084727 A1* | 3/2020 | Yerramalli | H04W 72/0473 |
| 2020/0186319 A1* | 6/2020 | Liao | H04L 5/0042 |
| 2020/0221384 A1* | 7/2020 | Ang | H04W 52/0229 |
| 2020/0221390 A1* | 7/2020 | Xu | H04W 52/0212 |
| 2020/0252936 A1* | 8/2020 | Tang | H04L 69/321 |
| 2020/0314816 A1* | 10/2020 | Yi | H04L 5/0094 |
| 2021/0021397 A1* | 1/2021 | Kim | H04L 1/1854 |
| 2021/0167930 A1* | 6/2021 | Jeon | H04L 5/0051 |
| 2021/0203468 A1* | 7/2021 | Yi | H04W 72/0453 |
| 2021/0243763 A1* | 8/2021 | Zhou | H04W 72/23 |
| 2021/0266076 A1* | 8/2021 | Chen | H04B 7/0874 |
| 2021/0282043 A1* | 9/2021 | Babaei | H04L 5/0098 |
| 2022/0007399 A1* | 1/2022 | Rastegardoost | H04L 1/1861 |
| 2022/0030659 A1* | 1/2022 | Kim | H04W 76/19 |
| 2022/0052829 A1* | 2/2022 | Kim | H04L 5/0098 |
| 2022/0070928 A1* | 3/2022 | Babaei | H04W 74/0808 |
| 2022/0116946 A1* | 4/2022 | Yang | H04L 1/1864 |
| 2022/0369227 A1* | 11/2022 | Ma | H04W 52/0225 |
| 2023/0042400 A1* | 2/2023 | Gursu | H04W 56/001 |
| 2023/0111063 A1* | 4/2023 | Ji | H04L 5/0057 370/329 |
| 2023/0116886 A1* | 4/2023 | Kim | H04L 5/0098 370/328 |
| 2023/0122848 A1* | 4/2023 | Kim | H04L 5/001 455/522 |
| 2023/0180173 A1* | 6/2023 | Kazmi | H04L 5/001 455/456.1 |
| 2023/0180199 A1* | 6/2023 | Jung | H04L 1/0038 |
| 2023/0199655 A1* | 6/2023 | Liu | H04W 52/0229 370/311 |
| 2023/0379819 A1* | 11/2023 | Du | H04W 52/0241 |
| 2023/0397180 A1* | 12/2023 | Lee | H04W 72/0457 |
| 2023/0403604 A1* | 12/2023 | Maleki | H04W 52/02 |
| 2024/0049069 A1* | 2/2024 | Zhou | H04W 74/0833 |
| 2024/0073879 A1* | 2/2024 | Park | H04W 72/0453 |
| 2024/0080854 A1* | 3/2024 | Kim | H04W 72/23 |
| 2024/0098725 A1* | 3/2024 | Liu | H04L 5/0098 |
| 2024/0276520 A1* | 8/2024 | Huang | H04L 1/1812 |
| 2024/0349186 A1* | 10/2024 | Zhou | G06F 1/3209 |
| 2024/0349357 A1* | 10/2024 | Park | H04W 74/006 |
| 2024/0389159 A1* | 11/2024 | Lee | H04L 5/0087 |
| 2024/0422590 A1* | 12/2024 | Kim | H04L 5/0098 |
| 2025/0016796 A1* | 1/2025 | Zhao | H04W 72/11 |
| 2025/0106778 A1* | 3/2025 | Liu | H04W 52/40 |

FOREIGN PATENT DOCUMENTS

| | | | | |
|---|---|---|---|---|
| CN | 115915303 A | * | 4/2023 | H04L 1/1812 |
| EP | 3624532 A1 | * | 3/2020 | H04B 7/0695 |
| EP | 3777359 B1 | * | 6/2025 | |
| WO | WO-2020063016 A1 | * | 4/2020 | H04W 72/04 |

* cited by examiner

DEACTIVATION OF SEMI-PERSISTENT SCHEDULING AND CONFIGURED GRANT RESOURCES DURING TEMPORARY BANDWIDTH PART SWITCHING

TECHNICAL FIELD

The following relates to wireless communications, including deactivation of semi-persistent scheduling (SPS) and configured grant resources during temporary bandwidth part switching.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

A UE may be configured with multiple component carriers and/or bandwidth parts. A network entity may configure the UE to temporarily switch between different component carriers and/or bandwidth parts to reduce network-side power consumption, among other reasons. For example, the UE may be configured by the network entity to switch from a first bandwidth part to a second bandwidth part for a temporary duration (for example, a finite duration), and the network entity may as a result reduce power consumption for the first bandwidth part. In some cases, the network entity may power down some radio frequency components associated with the first bandwidth part to improve energy savings. Also, if the UE is configured with semi-persistent resources, the network entity may transmit information to deactivate the semi-persistent resources while the UE is using the second bandwidth part for the temporary duration. However, this may result in increased overhead, among other issues, as signaling is used to both deactivate and activate the semi-persistent resources for the brief duration switch between the first bandwidth part and the second bandwidth part.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a user equipment (UE). The method includes receiving, via a first bandwidth part, a first downlink control information (DCI) message activating a semi-persistent resource for the first bandwidth part, switching to a second bandwidth part from the first bandwidth part for a temporary duration, and delaying, based on switching to the second bandwidth part, communications via the semi-persistent resource on the first bandwidth part for the temporary duration without receiving a second DCI message via the first bandwidth part that deactivates or releases the semi-persistent resource.

Another innovative aspect of the subject matter described in this disclosure can be implemented in an apparatus for wireless communication at a UE. The apparatus includes a processor. The apparatus includes memory coupled with the processor and storing instructions executable by the processor. The instructions may be executable by the processor to cause the apparatus to receive, via a first bandwidth part, a first DCI message activating a semi-persistent resource for the first bandwidth part, switch to a second bandwidth part from the first bandwidth part for a temporary duration, and delay, based on switching to the second bandwidth part, communications via the semi-persistent resource on the first bandwidth part for the temporary duration without receiving a second DCI message via the first bandwidth part that deactivates or releases the semi-persistent resource.

Another innovative aspect of the subject matter described in this disclosure can be implemented in another apparatus for wireless communication at a UE. The apparatus includes means for receiving, via a first bandwidth part, a first DCI message activating a semi-persistent resource for the first bandwidth part, means for switching to a second bandwidth part from the first bandwidth part for a temporary duration, and means for delaying, based on switching to the second bandwidth part, communications via the semi-persistent resource on the first bandwidth part for the temporary duration without receiving a second DCI message via the first bandwidth part that deactivates or releases the semi-persistent resource.

Another innovative aspect of the subject matter described in this disclosure can be implemented in a non-transitory computer-readable medium storing code for wireless communications at a UE. The code includes instructions executable by a processor to receive, via a first bandwidth part, a first DCI message activating a semi-persistent resource for the first bandwidth part, switch to a second bandwidth part from the first bandwidth part for a temporary duration, and delay, based on switching to the second bandwidth part, communications via the semi-persistent resource on the first bandwidth part for the temporary duration without receiving a second DCI message via the first bandwidth part that deactivates or releases the semi-persistent resource.

One innovative aspect of the subject matter described in this disclosure can be implemented in a method for wireless communication at a network entity. The method includes transmitting, via a first bandwidth part, a first DCI message activating a semi-persistent resource for the first bandwidth part, switching to a second bandwidth part from the first bandwidth part for a temporary duration, and delaying, based on switching to the second bandwidth part, communications via the semi-persistent resource on the first bandwidth part for the temporary duration without transmitting a second DCI message via the first bandwidth part that deactivates or releases the semi-persistent resource.

Another innovative aspect of the subject matter described in this disclosure can be implemented in an apparatus for wireless communication at a network entity. The apparatus includes a processor, memory coupled with the processor, and instructions stored in the memory. The instructions may be executable by the processor to cause the apparatus to transmit, via a first bandwidth part, a first DCI message activating a semi-persistent resource for the first bandwidth part, switch to a second bandwidth part from the first bandwidth part for a temporary duration, and delay, based on switching to the second bandwidth part, communications via the semi-persistent resource on the first bandwidth part for the temporary duration without transmitting a second DCI message via the first bandwidth part that deactivates or releases the semi-persistent resource.

Another innovative aspect of the subject matter described in this disclosure can be implemented in another apparatus for wireless communication at a network entity. The apparatus includes means for transmitting, via a first bandwidth part, a first DCI message activating a semi-persistent resource for the first bandwidth part, means for switching to a second bandwidth part from the first bandwidth part for a temporary duration, and means for delaying, based on switching to the second bandwidth part, communications via the semi-persistent resource on the first bandwidth part for the temporary duration without transmitting a second DCI message via the first bandwidth part that deactivates or releases the semi-persistent resource.

Another innovative aspect of the subject matter described in this disclosure can be implemented in a non-transitory computer-readable medium storing code for wireless communications at a network entity. The code includes instructions executable by a processor to transmit, via a first bandwidth part, a first DCI message activating a semi-persistent resource for the first bandwidth part, switch to a second bandwidth part from the first bandwidth part for a temporary duration, and delay, based on switching to the second bandwidth part, communications via the semi-persistent resource on the first bandwidth part for the temporary duration without transmitting a second DCI message via the first bandwidth part that deactivates or releases the semi-persistent resource.

DETAILED DESCRIPTION

Figure 1:
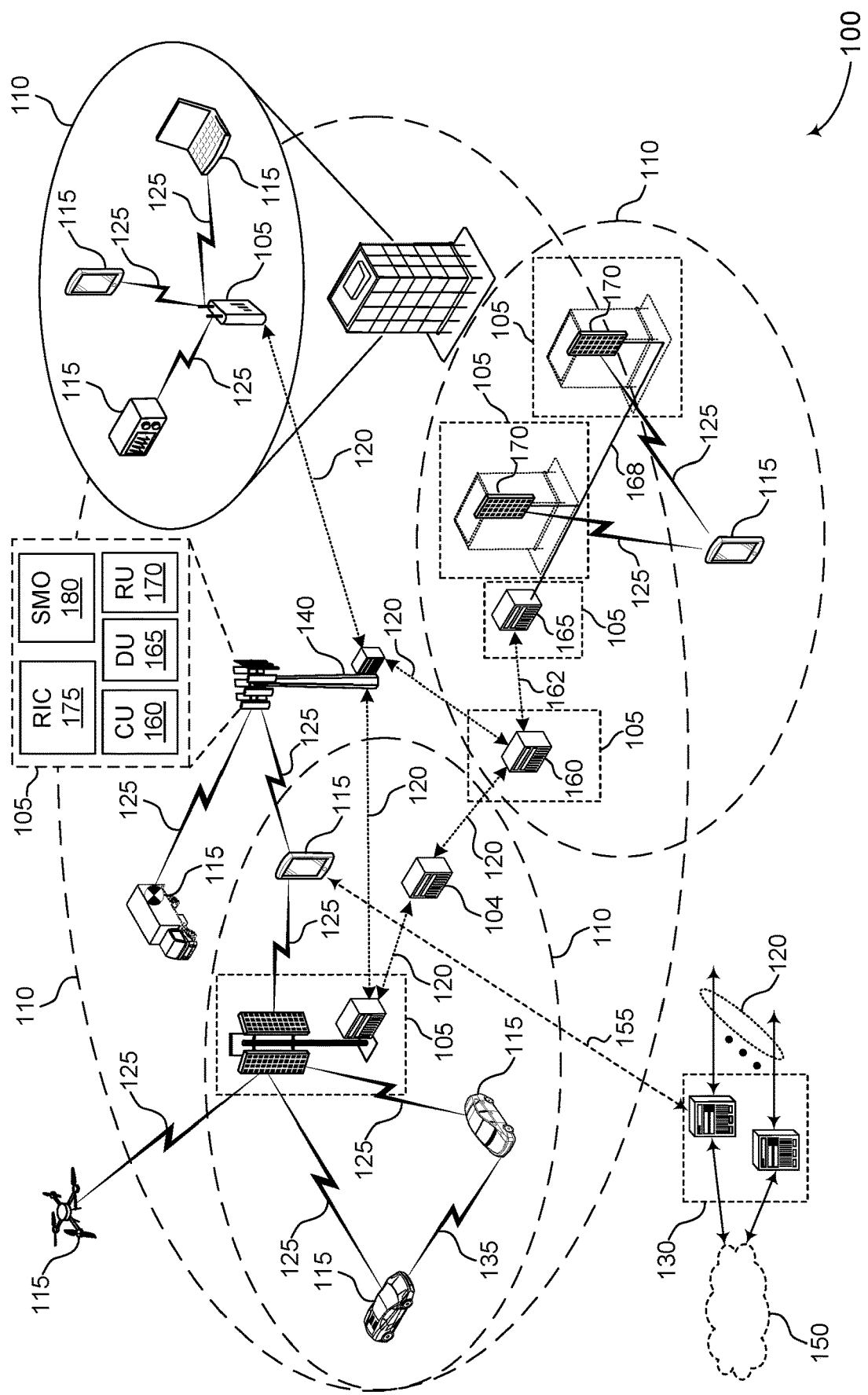
FIG. 1 illustrates an example of a wireless communications system that supports deactivation of semi-persistent scheduling (SPS) and configured grant resources during temporary bandwidth part switching in accordance with one or more aspects of the present disclosure.

A wireless network may dynamically update network-side parameters or configurations to reduce network-side power consumption. For example, the wireless network may dynamically update a channel state information (CSI) reference signal (CSI-RS) configuration, related antenna port configurations, transmit power configurations, and/or bandwidth configurations to reduce network-side power consumption. A user equipment (UE) may be configured with multiple bandwidth parts or component carriers, and may switch between the multiple bandwidth parts or component carriers to increase the network-side power savings. For example, the UE may switch from a first bandwidth part to a second bandwidth part for a temporary duration (for example, a finite duration such as a configured quantity of slots or while a timer is active), and switch back to the first bandwidth part after the temporary duration. If the UE is configured with semi-persistent resources (for example, semi-persistent scheduling (SPS) resources or configured grant (CG) resources), a network entity in some systems may transmit a message before the switch, such as a downlink control information (DCI) message, to deactivate the semi-persistent resources while the UE is using the temporary bandwidth part. However, this may result in increased overhead, among other problems, as signaling may be used to both deactivate and activate the semi-persistent resources for the brief switch between bandwidth parts.

Various aspects generally relate to efficient bandwidth part switching, and more specifically, to adapting semi-persistent resources during a temporary bandwidth part switch. A UE may be configured to temporarily deactivate or adapt semi-persistent resources for a temporary duration where the UE has changed bandwidth parts, such as a temporary switch from communicating via a first bandwidth part to communicating via a second bandwidth part, and in some examples from the second bandwidth part back to the first bandwidth part. For example, the UE may delay or drop communications via the semi-persistent resource (for example, SPS resources or CG resources) on the first bandwidth part while temporarily switched to the second bandwidth part. And while temporarily switched to the second bandwidth part, the UE may refrain from communicating via the active semi-persistent resource on the first bandwidth part without receiving a deactivation DCI to deactivate the semi-persistent resource, which is transmitted in other systems. In some examples, when the UE switches back from the second bandwidth part to the first bandwidth part after the temporary duration, the UE may resume communicating via the semi-persistent resource without receiving an additional activation DCI.

Particular aspects of the subject matter described in this disclosure may be implemented to realize one or more of the following potential advantages. The techniques employed by the described communication devices may provide reduced overhead and network-side power savings. For example, operations performed by the described communication devices may reduce overhead associated with semi-persistent communications and temporary bandwidth part switching by enabling a UE to deactivate, adapt, or drop semi-persistent resources while temporarily switched to another bandwidth part without receiving a deactivation or release DCI message, which may reduce resource overhead that would otherwise be used to send such a message. In some implementations, the operations performed by the described communication devices may additionally or alternatively reduce overhead when returning to (for example, switching back to) the original bandwidth part (for example, when switching back from a temporary bandwidth part), by enabling the UE to resume semi-persistent communications without receiving an additional activation or reactivation DCI message. For example, the UE may resume monitoring semi-persistent resource occasions after returning to the original bandwidth part without receiving an additional activation or reactivation message.

Aspects of the disclosure are initially described in the context of wireless communications systems. Aspects of the disclosure are further illustrated by and described with reference to apparatus diagrams, system diagrams, and flowcharts that relate to deactivation of SPS and configured grant resources during temporary bandwidth part switching.

FIG. 1 illustrates an example of a wireless communications system 100 that supports deactivation of SPS and configured grant resources during temporary bandwidth part switching in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, anode of the wireless communications system 100, which may be referred to as a network node, or a wireless node, may be a network entity 105 (for example, any network entity described herein), a UE 115 (for example, any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (for example, in accordance with an S1, N2, N3, or other interface protocol). In some examples, network entities 105 may communicate with one another via a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 via a communication link 155.

One or more of the network entities 105 described herein may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (RIC) 175 (for example, a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending on which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (for example, via one or more RUs 170). In some cases, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c, F1-u), and a DU 165 may be connected to one or more RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication via such communication links.

In wireless communications systems (for example, wireless communications system 100), infrastructure and spectral resources for radio access may support wireless backhaul link capabilities to supplement wired backhaul connections, providing an IAB network architecture (for example, to a core network 130). In some cases, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communications with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, one or more components of the disaggregated RAN architecture (for example, one or more IAB nodes 104 or components of IAB nodes 104) may be configured to operate according to the techniques described herein.

For instance, an access network (AN) or RAN may include communications between access nodes (for example, an IAB donor), IAB nodes 104, and one or more UEs 115. The IAB donor may facilitate connection between the core network 130 and the AN (for example, via a wired or wireless connection to the core network 130). That is, an IAB donor may refer to a RAN node with a wired or wireless connection to core network 130. The IAB donor may include a CU 160 and at least one DU 165 (for example, and RU 170), in which case the CU 160 may communicate with the core network 130 via an interface (for example, a backhaul link). IAB donor and IAB nodes 104 may communicate via an F1 interface according to a protocol that defines signaling messages (for example, an F1 AP protocol). Additionally, or alternatively, the CU 160 may communicate with the core network via an interface, which may be an example of a portion of backhaul link, and may communicate with other CUs 160 (for example, a CU 160 associated with an alternative IAB donor) via an Xn-C interface, which may be an example of a portion of a backhaul link.

An IAB node 104 may refer to a RAN node that provides IAB functionality (for example, access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (for example, an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (for example, DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (for example, a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (for example, transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support deactivation of SPS and configured grant resources during temporary bandwidth part switching as described herein. For example, some operations described as being performed by a UE 115 or a network entity 105 (for example, a base station 140) may additionally, or alternatively, be performed by one or more components of the disaggregated RAN architecture (for example, IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (for example, an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," when referring to a network entity 105, may refer to any portion of a network entity 105 (for example, a base station 140, a CU 160, a DU 165, a RU 170) of a RAN communicating with another device (for example, directly or via one or more other network entities 105).

In some examples, such as in a carrier aggregation configuration, a carrier may also have acquisition signaling or control signaling that coordinates operations for other carriers. A carrier may be associated with a frequency channel (for example, an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (for example, of the same or a different radio access technology).

The communication links 125 shown in the wireless communications system 100 may include downlink transmissions (for example, forward link transmissions) from a network entity 105 to a UE 115, uplink transmissions (for example, return link transmissions) from a UE 115 to a network entity 105, or both, among other configurations of transmissions. Carriers may carry downlink or uplink communications (for example, in an FDD mode) or may be configured to carry downlink and uplink communications (for example, in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (for example, 1.4, 3, 5, 10, 15, 20, 40, or 80 megahertz (MHz)). Devices of the wireless communications system 100 (for example, the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (for example, a sub-band, a BWP) or all of a carrier bandwidth.

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (for example, a duration of one modulation symbol) and one subcarrier, in which case the symbol period and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communications resource may refer to a combination of an RF spectrum resource, a time resource, and a spatial resource (for example, a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively-numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, a quantity of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (for example, using a carrier) and may be associated with an identifier for distinguishing neighboring cells (for example, a physical cell identifier (PCID), a virtual cell identifier (VCID), or others). In some examples, a cell also may refer to a coverage area 110 or a portion of a coverage area 110 (for example, a sector) over which the logical communication entity operates. Such cells may range from smaller areas (for example, a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered network entity 105 (for example, a lower-powered base station 140), as compared with a macro cell, and a small cell may operate using the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a network entity 105 (for example, a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (for example, base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a network entity 105 (for example, a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (for example, in accordance with a peer-to-peer (P2P), D2D, or sidelink protocol). In some examples, one or more UEs 115 of a group that are performing D2D communications may be within the coverage area 110 of a network entity 105 (for example, a base station 140, an RU 170), which may support aspects of such D2D communications being configured by (for example, scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (for example, less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (for example, from 30 GHz to 300 GHz), also known as the millimeter band. In some examples, the wireless communications system 100 may support millimeter wave (mmW) communications between the UEs 115 and the network entities 105 (for example, base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (for example, the same codeword) or different data streams (for example, different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communications with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along one or more directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) when receiving various signals from a receiving device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned along a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (for example, a communication link 125, a D2D communication link 135). HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A network may consume significant power to operate and support wireless communications. In some examples, the network or a network entity 105 may implement techniques to reduce network-side power consumption. For example, the network entity 105 may enter different sleep modes based on traffic. The network entity 105 may operate in a light sleep mode or a deep sleep mode if the network entity 105 experiences slower or less traffic. For example, if the network entity 105 does not have much traffic (for example, the network entity 105 actively serves few UEs 115), the network entity 105 may enter a deep sleep mode.

For some sleep nodes, the network entity 105 may disable radio frequency components, such as a radio frequency chain. Different sleep modes may have different power consumption and may have different transition times. For example, transitioning from high-power operation to a light sleep mode may take a first duration of time, while transitioning from the high-power operation to a deep sleep mode may take a second, longer duration of time.

In some examples, a network entity 105 may change or adapt parameters or configurations to reduce network energy consumption. For example, the network entity 105 may update parameters for a CSI-RS configuration, related antenna port configurations, transmit power configurations, bandwidth or bandwidth part configurations, among other.

In some examples, the network entity 105 may configure a UE 115 with multiple bandwidth parts or component carriers to change multiple configurations dynamically. For example, the network entity 105 may indicate for the UE 115 to switch from communicating via a first bandwidth part to communicating via a second bandwidth part. A configuration for the first bandwidth part may include multiple different configurations (for example, transmit power parameters, CSI-RS parameters, etc.), and by dynamically indicating for the UE to switch from communicating via the first bandwidth part to the second bandwidth part, the network entity 105 may dynamically change parameters for the multiple different configurations. The network entity 105 may dynamically indicate for the UE 115 to switch to a second bandwidth part, which may use less power consumption than the first bandwidth part, reducing network-side energy consumption.

In some cases, a UE 115 may be configured with a semi-persistent resource. For example, the UE 115 may be configured with a semi-persistently scheduled (SPS) resource for downlink signaling or a configured grant resource for uplink signaling. Due to frequent bandwidth part switching for network energy saving techniques, active semi-persistent resource configurations may be interrupted. For example, if the UE 115 is configured with an SPS configuration on a first bandwidth part and temporarily switches to a second bandwidth part, the SPS configuration on the first bandwidth part may be interrupted.

In some systems, the network entity 105 may transmit a DCI message to deactivate a semi-persistent resource prior to the UE 115 temporarily switching bandwidth parts, such as switching from a first (for example, primary) bandwidth part to a second bandwidth part. The network entity 105 may transmit another DCI message to reactivate the semi-persistent resource after the UE 115 switches back to the first bandwidth part. However, this may lead to significant overhead for the deactivation messages and reactivation messages, as the UE 115 may frequently be configured to perform the bandwidth part switching.

The wireless communications system 100, as well as wireless communications systems described herein, supports techniques for a temporary deactivation or adaptation of semi-persistent resources during a temporary bandwidth part switch. For example, a UE 115 may be configured with a semi-persistent resource on a first bandwidth part, and the UE 115 may be configured to switch from the first bandwidth part to a second bandwidth part for a temporary duration for network power savings. The UE 115 may not transmit or receive via any semi-persistent resource occasions while switched to the second bandwidth part. For example, the UE 115 may drop, delay, or ignore communications via the semi-persistent resource while temporarily switched to the second bandwidth part without receiving additional control signaling configuring the UE 115 to deactivate or release the semi-persistent resource. In some examples, upon returning or switching back to the first bandwidth part, the UE 115 may resume communications via the semi-persistent resource. For example, the UE 115 may resume communications via the semi-persistent resource without receiving additional signaling, such as an additional activation message or activation DCI message.

Figure 2:
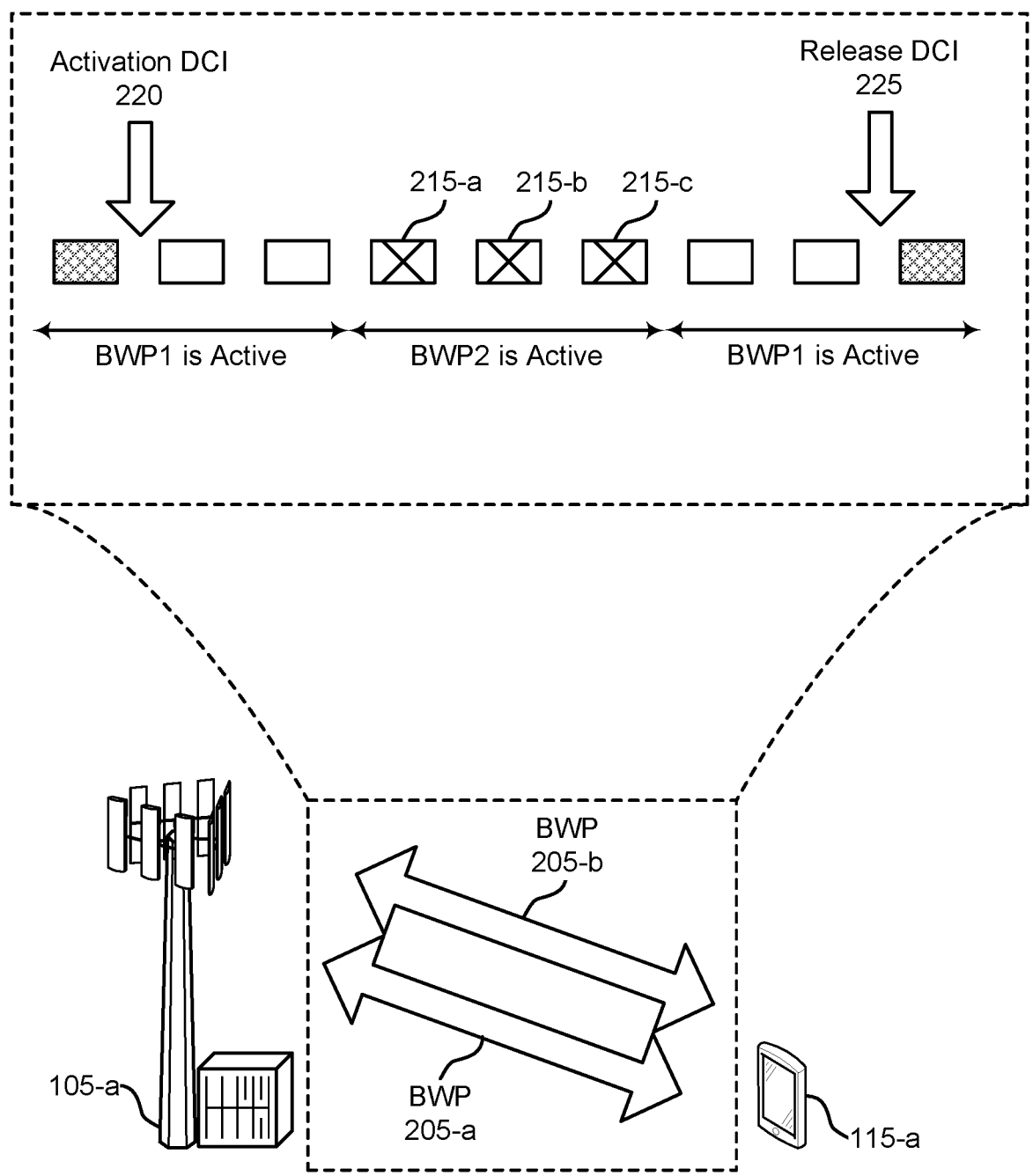
FIG. 2 illustrates an example of a wireless communications system that supports deactivation of SPS and configured grant resources during temporary bandwidth part switching in accordance with one or more aspects of the present disclosure.

FIG. 2 illustrates an example of a wireless communications system 200 that supports deactivation of SPS and configured grant resources during temporary bandwidth part switching in accordance with one or more aspects of the present disclosure. The wireless communications system 200 may include a UE 115-a and a network entity 105-a, which may be respective examples of a UE 115 and a network entity 105 described herein.

The UE 115-a may be configured to communicate with the network entity 105-a via one or more bandwidth parts, such as a first bandwidth part 205-a and a second bandwidth part 205-b. In some cases, the different bandwidth parts may have different sets of parameters or parameter values for one or more configurations. For example, the first bandwidth part 205-a may correspond to a first radio frequency spectrum band and have a first CSI-RS configuration, a first antenna port configuration, a first transmit power configuration, and/or a first TRS configuration. The second bandwidth part 205-b may correspond to a second radio frequency spectrum band and have a second CSI-RS configuration, a second antenna port configuration, a second transmit power configuration, and/or a second TRS configuration.

In some cases, the UE 115-a may be configured with the multiple bandwidth parts to support techniques for network-side power savings. For example, the UE 115-a may be configured or indicated to switch between communicating via the first bandwidth part 205-a and communicating via the second bandwidth part 205-b to reduce power consumption at the network or the network entity 105-a. For example, the network entity 105-a may occasionally power down radio frequency components for the first bandwidth part 205-a for a temporary duration to reduce power consumption, and the UE 115-a may switch to communicating via the second bandwidth part 205-b for the temporary duration (for example, while the radio frequency components associated with the first bandwidth part 205-a are powered down).

In some cases, the network entity 105-a may configure the UE 115-a to periodically or semi-persistently switch between bandwidth parts. In some cases, the UE 115-a maybe configured to switch to the second bandwidth part 205-b for an indicated quantity of slots with an indicated periodicity. For example, every 40 ms, the UE 115-a may temporarily switch to the second bandwidth part 205-b for 10 slots, then switch back to the first bandwidth part 205-a after the 10 slots. In some other cases, the UE 115-a may be configured with one or more timers, which may indicate when the UE 115-a is to perform a temporary bandwidth part switch. For example, the UE 115-a may communicate via the first bandwidth part 205-a while a first timer is active, then switch to a second bandwidth part 205-b when the first timer expires and start a second timer. When the second timer expires, the UE 115-a may switch to the first bandwidth part and restart the first timer.

In some cases, the network entity 105-a may dynamically configure the UE 115-a to temporarily switch bandwidth parts. For example, the network entity 105-a may transmit a control message indicating the UE 115-a to switch from the first bandwidth part 205-a to the second bandwidth part 205-b for the temporary duration. In some examples, the control message may indicate the temporary duration, or the network entity 105-a may configure the UE 115-a with the temporary duration via other signaling, such as an RRC message.

In some cases, the UE 115-a may be configured with a semi-persistent resource. An SPS resource for downlink signaling may be an example of the semi-persistent resource or a configured grant resource for uplink signaling may be an example of the semi-persistent resource. In some cases, the UE 115-*a* may be configured with multiple semi-persistent resources, such as a combination of SPS resources and configured grant resources, multiple SPS resources, multiple configured grant resources. The semi-persistent resource may include one or more inactive semi-persistent resource occasions 210, corresponding to when the semi-persistent resource is inactive or disabled, and one or more active semi-persistent resource occasions 215, corresponding to when the semi-persistent resource is active or enabled.

The network entity 105-*a* may transmit an activation message, such as an activation DCI 220, to the UE 115-*a*. The activation DCI 220 may activate or enable the semi-persistent resource on the first bandwidth part 205-*a*. For example, the semi-persistent resource may switch from inactive semi-persistent resource occasions 210 to active semi-persistent resource occasions 215 after receiving the activation DCI 220.

In some examples, the network entity 105-*a* may configure the UE 115-*a* to switch from the first bandwidth part 205-*a* to the second bandwidth part 205-*b* while the semi-persistent resource is active. In some examples, the wireless communications system 200 may support techniques for the UE 115-*a* to temporarily deactivate, or ignore, the semi-persistent resource or occasions of the semi-persistent resource during the temporary bandwidth part switch to the second bandwidth part 205-*b*. In some examples, while switched to the second bandwidth part 205-*b*, the semi-persistent resource may be considered temporarily deactivated. In some other examples, the semi-persistent resource may be active, but the UE 115-*a* may ignore or drop occasions for the semi-persistent resource while temporarily switched.

In some examples, the UE 115-*a* may not transmit or receive via active semi-persistent resource occasions 215 while switched to the second bandwidth part 205-*b*. For example, an active semi-persistent resource occasions 215-*a*, an active semi-persistent resource occasions 215-*b*, and an active semi-persistent resource occasions 215-*c* may occur while the UE 115-*a* is temporarily switched to the second bandwidth part 205-*b*. The UE 115-*a* may not communicate via the active semi-persistent resource occasions 215-*a*, 215-*b*, and 215-*c* while switched to the second bandwidth part 205-*b*. For example, the UE 115-*a* may not transmit via active configured grant occasions or receive via active SPS occasions while temporarily switched to the second bandwidth part 205-*b*.

In some examples, the UE 115-*a* may temporarily deactivate or adapt the active semi-persistent resource without receiving a deactivation or release message configuring the UE 115-*a* to deactivate or release the semi-persistent resource. For example, the UE 115-*a* may temporarily delay or drop the active semi-persistent resource occasions while temporarily switched to the second bandwidth part 205-*b* without receiving additional signaling. In some examples, the UE 115-*a* may not monitor for a deactivation message or a release message while the UE 115-*a* has temporarily switched bandwidth parts. For example, the UE 115-*a* may not monitor for a deactivation or release DCI for the semi-persistent resource while communicating via the second bandwidth part 205-*b*.

After the temporary duration, the UE 115-*a* may switch back to the first bandwidth part 205-*a*. In some examples, the UE 115-*a* may resume monitoring the active semi-persistent resource or the active semi-persistent resource occasions 215. In some examples, the UE 115-*a* may resume monitoring the active semi-persistent resource occasions 215 without receiving a new activation message, such as another activation DCI.

In some examples, the UE 115-*a* may receive a message to release or deactivate the semi-persistent resource, such as a release DCI 225. Upon receiving the release DCI 225, the occasions for the semi-persistent resource may be released or deactivated. For example, occasions for the semi-persistent resource may be active semi-persistent resource occasions 215 before receiving the release DCI 225 and inactive semi-persistent resource occasions 210 after receiving the release DCI 225.

In some examples, the network entity 105-*a* may release one or more semi-persistent resources configured for the UE 115-*a* while the UE 115-*a* is temporarily switched to the second bandwidth part 205-*b*. For example, the network entity 105-*a* may transmit a control message to the UE 115-*a* while the UE 115-*a* is operating on the second bandwidth part 205-*b*. The control message may deactivate one or more semi-persistent resources of the UE 115-*a*, such as the semi-persistent resource configured for the first bandwidth part 205-*a*. In some examples, the control message may include an identifier of the semi-persistent resource and/or a bandwidth part or component carrier associated with the semi-persistent resource, such as the first bandwidth part 205-*a*.

In some examples, the UE 115-*a* may monitor for an activation message, deactivation message, or a release message while the UE 115-*a* has temporarily switched bandwidth parts. For example, the UE 115-*a* may monitor for a release DCI for the semi-persistent resource associated with the first bandwidth part while the UE 115-*a* is temporarily switched to the second bandwidth part 205-*b*.

In some examples, the network entity 105-*a* may activate one or more semi-persistent resources configured for the UE 115-*a* while the UE 115-*a* is temporarily switched to the second bandwidth part 205-*b*. For example, the UE 115-*a* may receive control signaling from the network entity 105-*a* configuring a second semi-persistent resource, but the second semi-persistent resource may not be active. For example, the UE 115-*a* may not have received an activation message to activate the second semi-persistent resource. The UE 115-*a* may move to the temporary bandwidth part, such as the second bandwidth part 205-*b*, for the temporary duration. While communicating via the temporary bandwidth part, the UE 115-*a* may receive, such as from the network entity 105-*a*, an activation message for the second semi-persistent resource. At the end of the temporary bandwidth part switch, or after the temporary duration, the UE 115-*a* may communicate via occasions of the second semi-persistent resource on the first bandwidth part 205-*a* based on the activation message received via the second bandwidth part 205-*b*. For example, the UE 115-*a* may transmit, or autonomously transmit, via configured grant occasions of the second semi-persistent resource based on the second semi-persistent resource being triggered or activated in the temporary bandwidth part. In some examples, the UE 115-*a* may not communicate via occasions for the second semi-persistent resource until after the temporary duration and the UE 115-*a* switches back to the first bandwidth part 205-*a*.

In some examples, the network entity 105-*a* may indicate whether control messages for semi-persistent resources are to be transmitted during a temporary bandwidth part switch. For example, the network entity 105-*a* may transmit an RRC message to the UE 115-*a* indicating that a semi-persistent resource on the first bandwidth part 205-*a* may be activated, deactivated, or released while the UE 115-*a* performs a temporary bandwidth part switch. The UE 115-*a* may monitor for activation, deactivation, or release DCI messages while temporarily switched to the second bandwidth part 205-*b* based on the RRC message. In some other examples, the network entity 105-*a* may indicate that the semi-persistent resource may not be modified while the UE 115-*a* performs the temporary bandwidth part switch, and the UE 115-*a* may not monitor for activation, deactivation, or release DCI messages while temporarily switched to the second bandwidth part 205-*b*.

These techniques may enable dynamic adaptation of semi-persistent resource occasions while performing a temporary bandwidth part switch. For example, the UE 115-*a* or the network entity 105-*a*, or both, may drop or delay occasions for a semi-persistent resource while the UE 115-*a* performs a temporary bandwidth part switch without additional signaling, such as deactivation or release messages. Additionally, these techniques may enable the UE 115-*a* or the network entity 105-*a*, or both, to resume occasions for the active semi-persistent resource when the temporary bandwidth part switch ends, or the UE 115-*a* returns to the first bandwidth part 205-*a*, without additional activation signaling.

Figure 3:
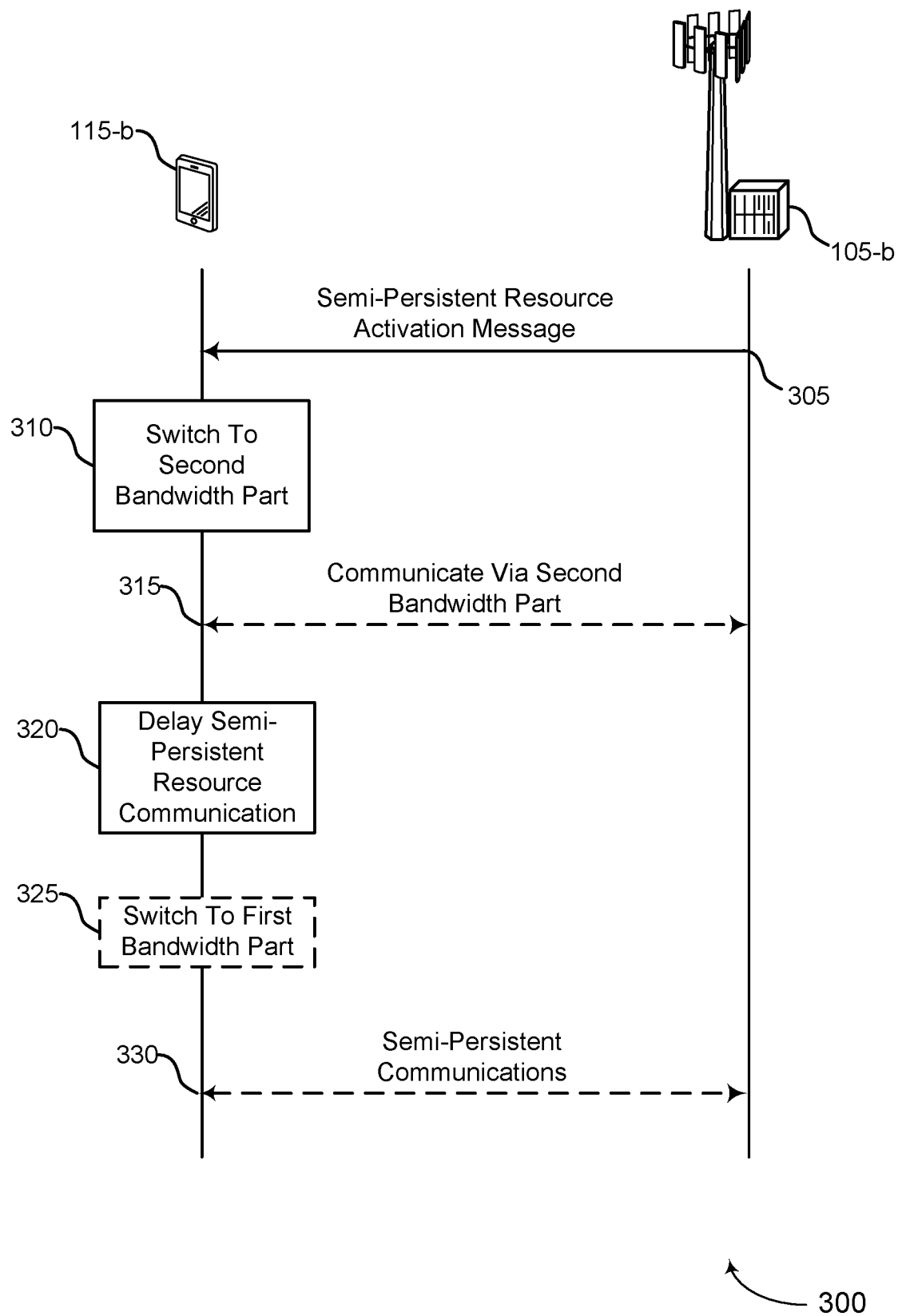
FIG. 3 illustrates an example of a process flow that supports deactivation of SPS and configured grant resources during temporary bandwidth part switching in accordance with one or more aspects of the present disclosure.

FIG. 3 illustrates an example of a process flow 300 that supports deactivation of SPS and configured grant resources during temporary bandwidth part switching in accordance with one or more aspects of the present disclosure. The process flow 300 may be implemented by a UE 115-*b* or a network entity 105-*b*, or both, which may be respective examples of a UE 115 and a network entity 105 as described herein.

At 305, the network entity 105-*b* may transmit an activation message to the UE 115-*b* for a semi-persistent resource. For example, the UE 115-*b* may receive, via a first bandwidth part, a first DCI message activating a semi-persistent resource for the first bandwidth part. In some examples, the semi-persistent resource is a configured grant resource for semi-persistent uplink signaling. In some examples, the semi-persistent resource is an SPS resource for semi-persistent downlink signaling.

The UE 115-*b* may be configured with multiple bandwidth parts or component carriers, and the UE 115-*b* may be configured to temporarily switch between bandwidth parts or component carriers. In some cases, switching between bandwidth parts or component carriers may reduce network-side energy consumption.

At 310, the UE 115-*b* may switch from communicating via the first bandwidth part to communicating via a second bandwidth part. For example, the UE 115-*b* may switch to the second bandwidth part from the first bandwidth part for a temporary duration. In some examples, the UE 115-*b* may periodically switch to the second bandwidth part for the temporary duration. Additionally, or alternatively, the network entity 105-*b* may transmit a control message configuring the UE 115-*b* to switch to the second bandwidth part for the temporary duration. In some examples, the UE 115-*b* may communicate with the network entity 105-*b* via the second bandwidth part at 315.

At 320, the UE 115-*b* may adapt or drop occasions for the semi-persistent resource. For example, the UE 115-*b* or the network entity 105-*b*, or both, may delay, based the UE 115-*b* switching to the second bandwidth part, communications via the semi-persistent resource on the first bandwidth part for the temporary duration. In some examples, the UE 115-*b* may delay the communications without receiving a second DCI message, via the first bandwidth part, that deactivates or releases the semi-persistent resource. For example, the UE 115-*b* may drop or refrain from communicating on occasions for the semi-persistent resource while temporarily switched to the second bandwidth part without receiving an additional DCI configuring the UE 115-*b* to release or deactivate the semi-persistent resource.

In some examples, the UE 115-*b* may drop one or more occasions for the semi-persistent resource based on switching, or being switched, to the second bandwidth part for the temporary duration. In some examples, the UE 115-*b* may deactivate the semi-persistent resource for the temporary duration based on switching to the second bandwidth part.

In some examples, the UE 115-*b* may return to the first bandwidth part after the temporary duration at 325. For example, the UE 115-*b* may switch to the first bandwidth part, from the second bandwidth part, after the temporary duration. In some examples, the UE 115-*b* may communicate via the semi-persistent resource configured for the first bandwidth part after the temporary duration based on the first DCI message at 330. For example, the UE 115-*b* may communicate via the semi-persistent resource after the temporary duration occurs without receiving an additional DCI message activating the semi-persistent resource. For example, the UE 115-*b* may drop occasions or delay communications via the semi-persistent resource while temporarily switched to the second bandwidth part without receiving any additional signaling to either deactivate the semi-persistent resource or reactivate the semi-persistent resource.

In some examples, the UE 115-*b* may receive, from the network entity 105-*b* via the second bandwidth part, a second DCI message that deactivates or releases the semi-persistent resource. For example, the semi-persistent resource may be deactivated or released while the UE 115-*b* is temporarily switched to the second bandwidth part. In examples cases, after switching back to the first bandwidth part at 325, the UE 115-*b* may not monitor occasions for the semi-persistent resource based on the semi-persistent resource being deactivated or released. In some examples, the second DCI may include an identifier of the semi-persistent resource or the first bandwidth part, or both.

Figure 4:
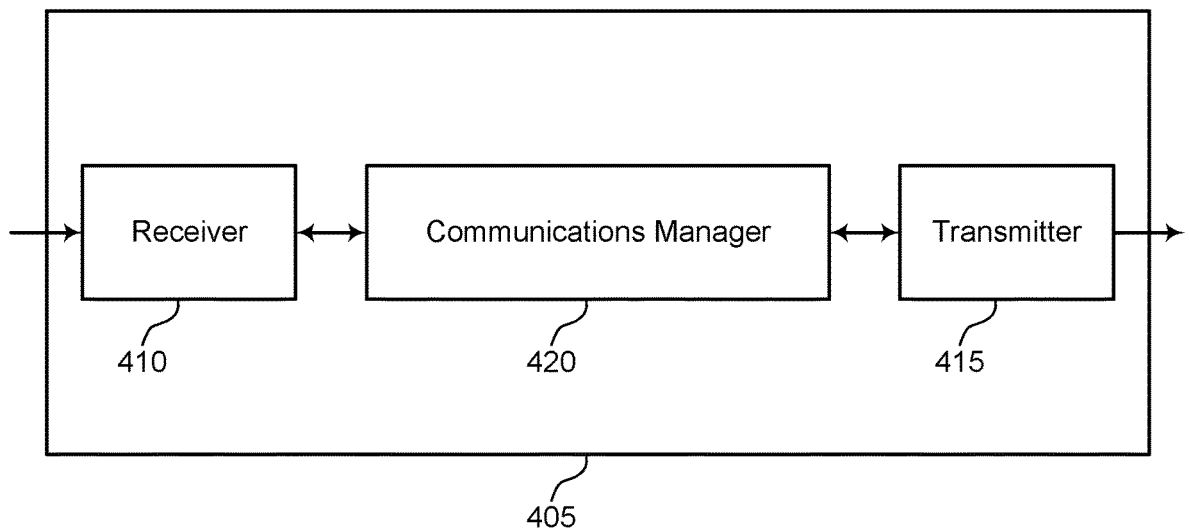
FIGS. 4 and 5 show block diagrams of devices that support deactivation of SPS and configured grant resources during temporary bandwidth part switching in accordance with one or more aspects of the present disclosure.

FIG. 4 shows a block diagram of a device 405 that supports deactivation of SPS and configured grant resources during temporary bandwidth part switching in accordance with one or more aspects of the present disclosure. The device 405 may be an example of aspects of a UE 115 as described herein. The device 405 may include a receiver 410, a transmitter 415, and a communications manager 420. The communications manager 420 can be implemented, at least in part, by one or both of a modem and a processor. Each of these components may be in communication with one another (for example, via one or more buses).

The receiver 410 may provide a means for receiving information such as packets, user data, control information, or any combination thereof associated with various information channels (for example, control channels, data channels, information channels related to deactivation of SPS and configured grant resources during temporary bandwidth part switching). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (for example, control channels, data channels, information channels related to deactivation of SPS and configured grant resources during temporary bandwidth part switching). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of deactivation of SPS and configured grant resources during temporary bandwidth part switching as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (for example, in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communications manager 420, the receiver 410, the transmitter 415, or various combinations or components thereof may be implemented in code (for example, as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communications manager 420 may be configured to perform various operations (for example, receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a UE in accordance with examples as disclosed herein. For example, the communications manager 420 may be configured as or otherwise support a means for receiving, via a first bandwidth part, a first DCI message activating a semi-persistent resource for the first bandwidth part. The communications manager 420 may be configured as or otherwise support a means for switching to a second bandwidth part from the first bandwidth part for a temporary duration. The communications manager 420 may be configured as or otherwise support a means for delaying, based on switching to the second bandwidth part, communications via the semi-persistent resource on the first bandwidth part for the temporary duration without receiving a second DCI message via the first bandwidth part that deactivates or releases the semi-persistent resource.

By including or configuring the communications manager 420 in accordance with examples as described herein, the device 405 (for example, a processor controlling or otherwise coupled with the receiver 410, the transmitter 415, the communications manager 420, or a combination thereof) may support techniques for reduced overhead and reduced power consumption. For example, the device 405 may be configured to drop or delay communications for a semi-persistent resource while temporarily switched to a different bandwidth part without receiving signaling configuring the device 405 to deactivate or release the semi-persistent resource, reducing overhead. Similarly, the device 405 may be supported to resume communications for the semi-persistent resource after the temporary bandwidth part switch without receiving signaling configuring the device 405 to resume or reactivate the semi-persistent resource, further reducing signaling overhead and power consumption to process the signaling.

Figure 5:
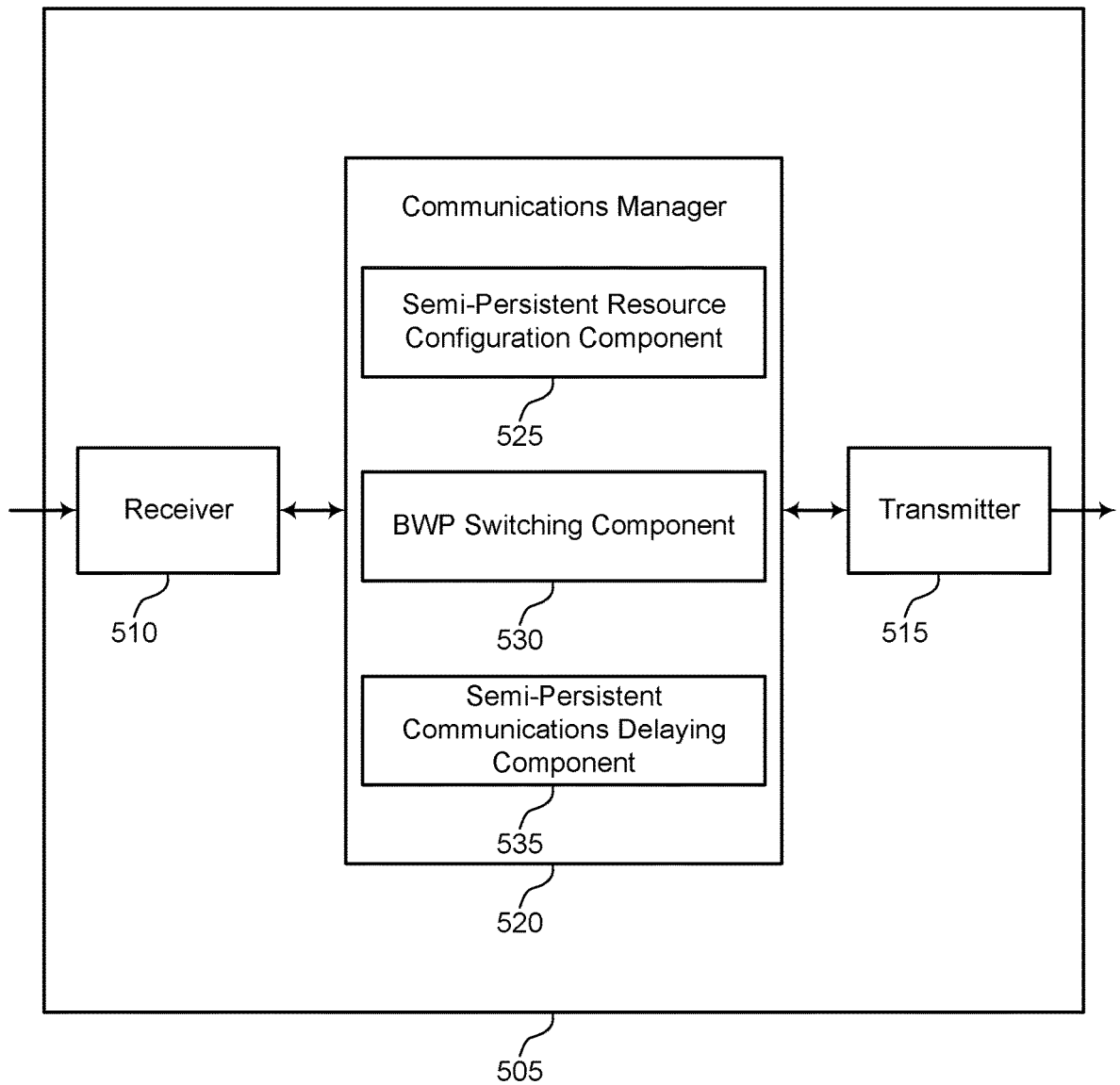

FIG. 5 shows a block diagram of a device 505 that supports deactivation of SPS and configured grant resources during temporary bandwidth part switching in accordance with one or more aspects of the present disclosure. The device 505 may be an example of aspects of a device 405 or a UE 115 as described herein. The device 505 may include a receiver 510, a transmitter 515, and a communications manager 520. The communications manager 520 can be implemented, at least in part, by one or both of a modem and a processor. Each of these components may be in communication with one another (for example, via one or more buses).

The receiver 510 may provide a means for receiving information such as packets, user data, control information, or any combination thereof associated with various information channels (for example, control channels, data channels, information channels related to deactivation of SPS and configured grant resources during temporary bandwidth part switching). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (for example, control channels, data channels, information channels related to deactivation of SPS and configured grant resources during temporary bandwidth part switching). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of deactivation of SPS and configured grant resources during temporary bandwidth part switching as described herein. For example, the communications manager 520 may include a semi-persistent resource configuration component 525, a BWP switching component 530, a semi-persistent communications delaying component 535, or any combination thereof. In some examples, the communications manager 520, or various components thereof, may be configured to perform various operations (for example, receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. The semi-persistent resource configuration component 525 may be configured as or otherwise support a means for receiving, via a first bandwidth part, a first DCI message activating a semi-persistent resource for the first bandwidth part. The BWP switching component 530 may be configured as or otherwise support a means for switching to a second bandwidth part from the first bandwidth part for a temporary duration. The semi-persistent communications delaying component 535 may be configured as or otherwise support a means for delaying, based on switching to the second bandwidth part, communications via the semi-persistent resource on the first bandwidth part for the temporary duration without receiving a second DCI message via the first bandwidth part that deactivates or releases the semi-persistent resource.

Figure 6:
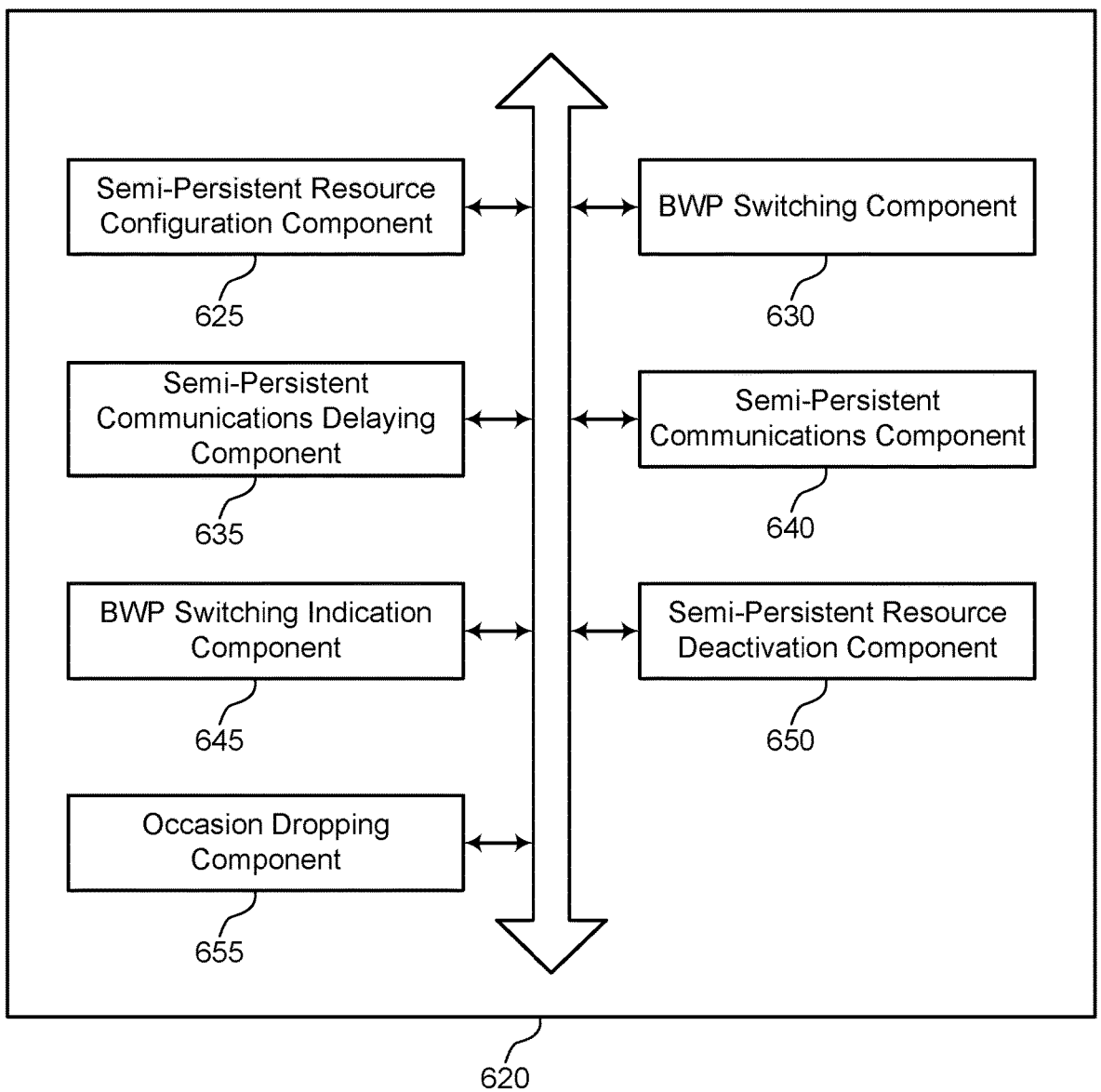
FIG. 6 shows a block diagram of a communications manager that supports deactivation of SPS and configured grant resources during temporary bandwidth part switching in accordance with one or more aspects of the present disclosure.

FIG. 6 shows a block diagram of a communications manager 620 that supports deactivation of SPS and configured grant resources during temporary bandwidth part switching in accordance with one or more aspects of the present disclosure. The communications manager 620, or various components thereof, may be an example of means for performing various aspects of deactivation of SPS and configured grant resources during temporary bandwidth part switching as described herein. For example, the communications manager 620 may include a semi-persistent resource configuration component 625, a BWP switching component 630, a semi-persistent communications delaying component 635, a semi-persistent communications component 640, a BWP switching indication component 645, a semi-persistent resource deactivation component 650, an occasion dropping component 655, or any combination thereof. Each of these components may communicate, directly or indirectly, with one another (for example, via one or more buses).

The communications manager 620 may support wireless communications at a UE in accordance with examples as disclosed herein. The semi-persistent resource configuration component 625 may be configured as or otherwise support a means for receiving, via a first bandwidth part, a first DCI message activating a semi-persistent resource for the first bandwidth part. The BWP switching component 630 may be configured as or otherwise support a means for switching to a second bandwidth part from the first bandwidth part for a temporary duration. The semi-persistent communications delaying component 635 may be configured as or otherwise support a means for delaying, based on switching to the second bandwidth part, communications via the semi-persistent resource on the first bandwidth part for the temporary duration without receiving a second DCI message via the first bandwidth part that deactivates or releases the semi-persistent resource.

In some examples, the BWP switching component 630 may be configured as or otherwise support a means for switching to the first bandwidth part after the temporary duration. In some examples, the semi-persistent communications component 640 may be configured as or otherwise support a means for communicating via the semi-persistent resource configured for the first bandwidth part after the temporary duration based on the first DCI message.

In some examples, communicating via the semi-persistent resource after the temporary duration occurs without receiving an additional DCI message activating the semi-persistent resource.

In some examples, the BWP switching indication component 645 may be configured as or otherwise support a means for receiving a control message indicating to switch to the second bandwidth part for the temporary duration, where switching to the second bandwidth part is based on the control message.

In some examples, the control message indicates a quantity of slots for the temporary duration or a timer for the temporary duration.

In some examples, the semi-persistent resource deactivation component 650 may be configured as or otherwise support a means for receiving, via the second bandwidth part, the second DCI message that deactivates or releases the semi-persistent resource.

In some examples, the second DCI message includes an identifier of the semi-persistent resource, or the first bandwidth part, or both.

In some examples, the semi-persistent resource configuration component 625 may be configured as or otherwise support a means for receiving, via the second bandwidth part during the temporary duration, an activation DCI message for a second semi-persistent resource for the first bandwidth part.

In some examples, the BWP switching component 630 may be configured as or otherwise support a means for switching to the first bandwidth part after the temporary duration. In some examples, the semi-persistent communications component 640 may be configured as or otherwise support a means for communicating via the second semi-persistent resource configured for the first bandwidth part after the temporary duration based on the activation DCI message.

In some examples, the occasion dropping component 655 may be configured as or otherwise support a means for dropping one or more occasions for the semi-persistent resource based on switching to the second bandwidth part for the temporary duration.

In some examples, the semi-persistent communications delaying component 635 may be configured as or otherwise support a means for deactivating the semi-persistent resource for the temporary duration based on switching to the second bandwidth part.

In some examples, the semi-persistent communications component 640 may be configured as or otherwise support a means for transmitting an uplink message via an occasion of the semi-persistent resource, where the semi-persistent resource is a configured grant resource.

In some examples, the semi-persistent communications component 640 may be configured as or otherwise support a means for receiving a downlink message via an occasion of the semi-persistent resource, where the semi-persistent resource is a SPS resource.

In some examples, the temporary duration is a quantity of slots, a quantity of symbols, or a quantity of time, or any combination thereof.

In some examples, the temporary duration is based on a first configuration for the first bandwidth part, or a second configuration for the second bandwidth part, or both.

Figure 7:
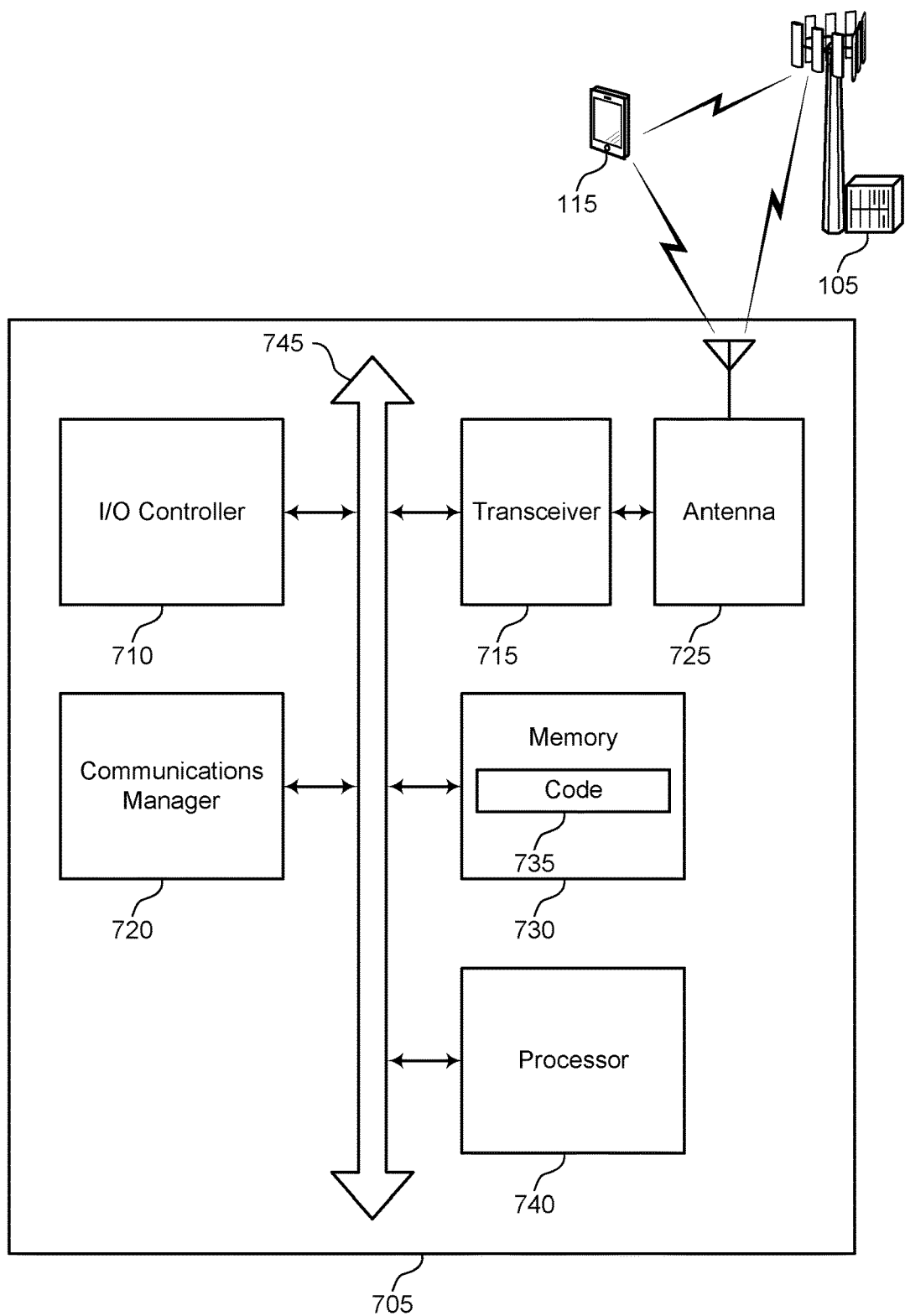
FIG. 7 shows a diagram of a system including a device that supports deactivation of SPS and configured grant resources during temporary bandwidth part switching in accordance with one or more aspects of the present disclosure.

FIG. 7 shows a diagram of a system including a device 705 that supports deactivation of SPS and configured grant resources during temporary bandwidth part switching in accordance with one or more aspects of the present disclosure. The device 705 may be an example of or include the components of a device 405, a device 505, or a UE 115 as described herein. The device 705 may communicate (for example, wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (for example, operatively, communicatively, functionally, electronically, electrically) via one or more buses (for example, a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (for example, when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (for example, the memory 730) to cause the device 705 to perform various functions (for example, functions or tasks supporting deactivation of SPS and configured grant resources during temporary bandwidth part switching). For example, the device 705 or a component of the device 705 may include a processor 740 and memory 730 coupled with or to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, via a first bandwidth part, a first DCI message activating a semi-persistent resource for the first bandwidth part. The communications manager 720 may be configured as or otherwise support a means for switching to a second bandwidth part from the first bandwidth part for a temporary duration. The communications manager 720 may be configured as or otherwise support a means for delaying, based on switching to the second bandwidth part, communications via the semi-persistent resource on the first bandwidth part for the temporary duration without receiving a second DCI message via the first bandwidth part that deactivates or releases the semi-persistent resource.

By including or configuring the communications manager 720 in accordance with examples as described herein, the device 705 may support techniques for reduced overhead and reduced power consumption. For example, the device 705 may be configured to drop or delay communications for a semi-persistent resource while temporarily switched to a different bandwidth part without receiving signaling configuring the device 705 to deactivate or release the semi-persistent resource, reducing overhead. Similarly, the device 705 may be supported to resume communications for the semi-persistent resource after the temporary bandwidth part switch without receiving signaling configuring the device 705 to resume or reactivate the semi-persistent resource, further reducing signaling overhead and power consumption to process the signaling. Additionally, these techniques may enable network-side power savings, reducing energy consumption of a wireless communications system including the device 705.

In some examples, the communications manager 720 may be configured to perform various operations (for example, receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of deactivation of SPS and configured grant resources during temporary bandwidth part switching as described herein, or the processor 740 and the memory 730 may be otherwise configured to perform or support such operations.

Figure 8:
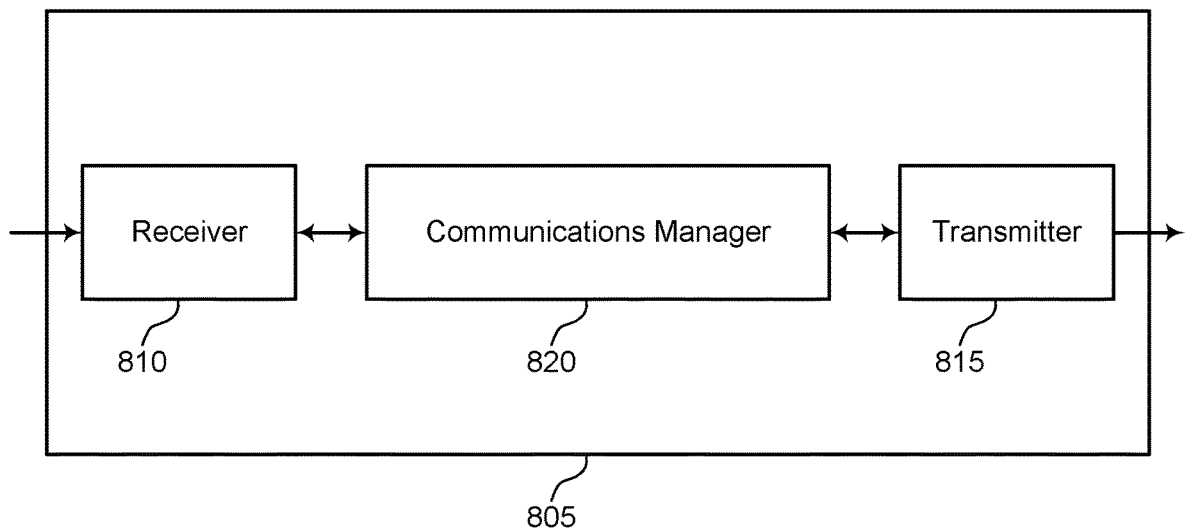
FIGS. 8 and 9 show block diagrams of devices that support deactivation of SPS and configured grant resources during temporary bandwidth part switching in accordance with one or more aspects of the present disclosure.

FIG. 8 shows a block diagram of a device 805 that supports deactivation of SPS and configured grant resources during temporary bandwidth part switching in accordance with one or more aspects of the present disclosure. The device 805 may be an example of aspects of a network entity 105 as described herein. The device 805 may include a receiver 810, a transmitter 815, and a communications manager 820. The communications manager 820 can be implemented, at least in part, by one or both of a modem and a processor. Each of these components may be in communication with one another (for example, via one or more buses).

The receiver 810 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (for example, electrical, fiber optic) interfaces, wireless interfaces, or any combination thereof.

The transmitter 815 may provide a means for outputting (for example, transmitting, providing, conveying, sending) information generated by other components of the device 805. For example, the transmitter 815 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (for example, electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of deactivation of SPS and configured grant resources during temporary bandwidth part switching as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (for example, in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communications manager 820, the receiver 810, the transmitter 815, or various combinations or components thereof may be implemented in code (for example, as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communications manager 820 may be configured to perform various operations (for example, receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. For example, the communications manager 820 may be configured as or otherwise support a means for transmitting, via a first bandwidth part, a first DCI message activating a semi-persistent resource for the first bandwidth part. The communications manager 820 may be configured as or otherwise support a means for switching to a second bandwidth part from the first bandwidth part for a temporary duration. The communications manager 820 may be configured as or otherwise support a means for delaying, based on switching to the second bandwidth part, communications via the semi-persistent resource on the first bandwidth part for the temporary duration without transmitting a second DCI message via the first bandwidth part that deactivates or releases the semi-persistent resource.

By including or configuring the communications manager 820 in accordance with examples as described herein, the device 805 (for example, a processor controlling or otherwise coupled with the receiver 810, the transmitter 815, the communications manager 820, or a combination thereof) may support techniques for reduced overhead and reduced power consumption. For example, the device 805 may be configured to drop or delay communications for a semi-persistent resource while a UE 115 configured with the semi-persistent resource is temporarily switched to a different bandwidth part without transmitting signaling configuring the UE 115 to deactivate or release the semi-persistent resource, reducing overhead. Similarly, the device 805 may be supported to resume communications for the semi-persistent resource after the temporary bandwidth part switch without transmitting signaling configuring the UE 115 to resume or reactivate the semi-persistent resource, further reducing signaling overhead and power consumption to generate and transmit the signaling. Additionally, these techniques may enable network-side power savings, where the device 805 may switch between configurations to reduce power consumption.

Figure 9:
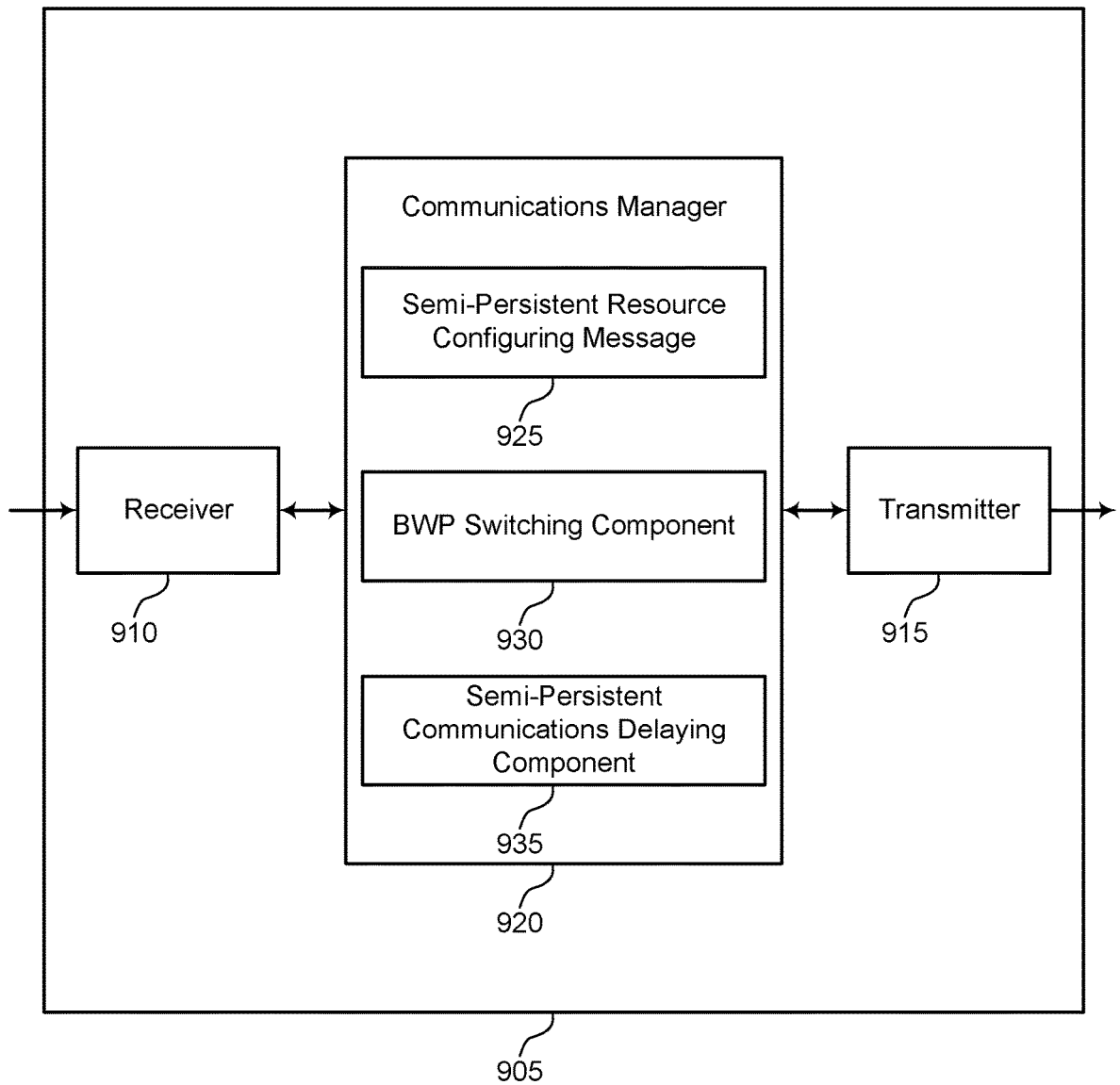

FIG. 9 shows a block diagram of a device 905 that supports deactivation of SPS and configured grant resources during temporary bandwidth part switching in accordance with one or more aspects of the present disclosure. The device 905 may be an example of aspects of a device 805 or a network entity 105 as described herein. The device 905 may include a receiver 910, a transmitter 915, and a communications manager 920. The communications manager 920 can be implemented, at least in part, by one or both of a modem and a processor. Each of these components may be in communication with one another (for example, via one or more buses).

The receiver 910 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (for example, electrical, fiber optic) interfaces, wireless interfaces, or any combination thereof.

The transmitter 915 may provide a means for outputting (for example, transmitting, providing, conveying, sending) information generated by other components of the device 905. For example, the transmitter 915 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (for example, electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of deactivation of SPS and configured grant resources during temporary bandwidth part switching as described herein. For example, the communications manager 920 may include a semi-persistent resource configuring message 925, a BWP switching component 930, a semi-persistent communications delaying component 935, or any combination thereof. In some examples, the communications manager 920, or various components thereof, may be configured to perform various operations (for example, receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. The semi-persistent resource configuring message 925 may be configured as or otherwise support a means for transmitting, via a first bandwidth part, a first DCI message activating a semi-persistent resource for the first bandwidth part. The BWP switching component 930 may be configured as or otherwise support a means for switching to a second bandwidth part from the first bandwidth part for a temporary duration. The semi-persistent communications delaying component 935 may be configured as or otherwise support a means for delaying, based on switching to the second bandwidth part, communications via the semi-persistent resource on the first bandwidth part for the temporary duration without transmitting a second DCI message via the first bandwidth part that deactivates or releases the semi-persistent resource.

Figure 10:
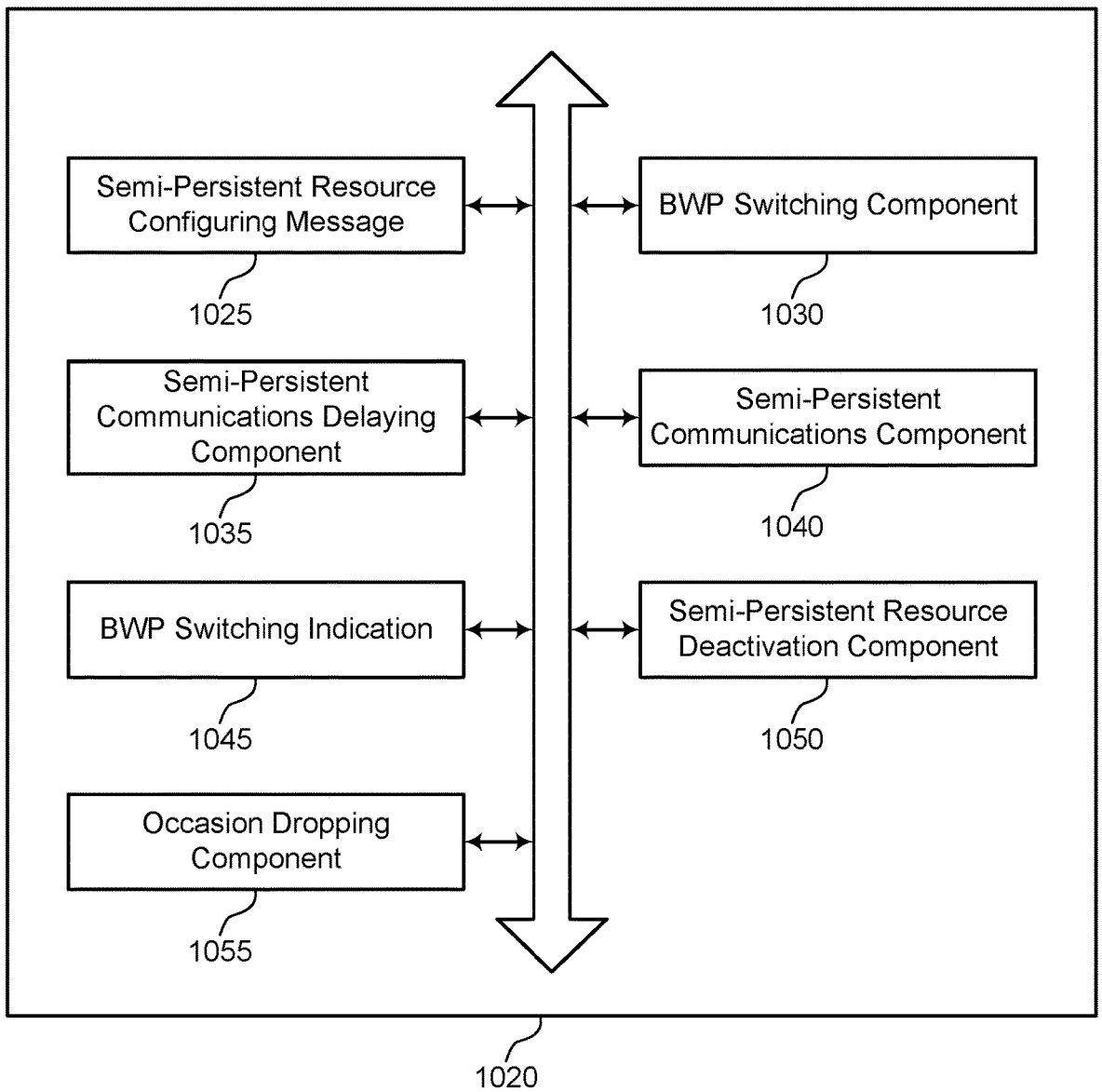
FIG. 10 shows a block diagram of a communications manager that supports deactivation of SPS and configured grant resources during temporary bandwidth part switching in accordance with one or more aspects of the present disclosure.

FIG. 10 shows a block diagram of a communications manager 1020 that supports deactivation of SPS and configured grant resources during temporary bandwidth part switching in accordance with one or more aspects of the present disclosure. The communications manager 1020, or various components thereof, may be an example of means for performing various aspects of deactivation of SPS and configured grant resources during temporary bandwidth part switching as described herein. For example, the communications manager 1020 may include a semi-persistent resource configuring message 1025, a BWP switching component 1030, a semi-persistent communications delaying component 1035, a semi-persistent communications component 1040, a BWP switching indication 1045, a semi-persistent resource deactivation component 1050, an occasion dropping component 1055, or any combination thereof. Each of these components may communicate, directly or indirectly, with one another (for example, via one or more buses) which may include communications within a protocol layer of a protocol stack, communications associated with a logical channel of a protocol stack (for example, between protocol layers of a protocol stack, within a device, component, or virtualized component associated with a network entity 105, between devices, components, or virtualized components associated with a network entity 105), or any combination thereof.

The communications manager 1020 may support wireless communications at a network entity in accordance with examples as disclosed herein. The semi-persistent resource configuring message 1025 may be configured as or otherwise support a means for transmitting, via a first bandwidth part, a first DCI message activating a semi-persistent resource for the first bandwidth part. The BWP switching component 1030 may be configured as or otherwise support a means for switching to a second bandwidth part from the first bandwidth part for a temporary duration. The semi-persistent communications delaying component 1035 may be configured as or otherwise support a means for delaying, based on switching to the second bandwidth part, communications via the semi-persistent resource on the first bandwidth part for the temporary duration without transmitting a second DCI message via the first bandwidth part that deactivates or releases the semi-persistent resource.

In some examples, the BWP switching component 1030 may be configured as or otherwise support a means for switching to the first bandwidth part after the temporary duration. In some examples, the semi-persistent communications component 1040 may be configured as or otherwise support a means for communicating via the semi-persistent resource configured for the first bandwidth part after the temporary duration based on the first DCI message.

In some examples, communicating via the semi-persistent resource after the temporary duration occurs without transmitting an additional DCI message activating the semi-persistent resource.

In some examples, the BWP switching indication 1045 may be configured as or otherwise support a means for transmitting a control message indicating to switch to the second bandwidth part for the temporary duration, where switching to the second bandwidth part is based on the control message.

In some examples, the control message indicates a quantity of slots for the temporary duration or a timer for the temporary duration.

In some examples, the semi-persistent resource deactivation component 1050 may be configured as or otherwise support a means for transmitting, via the second bandwidth part, the second DCI message that deactivates or releases the semi-persistent resource.

In some examples, the second DCI message includes an identifier of the semi-persistent resource or the first bandwidth part, or both.

In some examples, the occasion dropping component 1055 may be configured as or otherwise support a means for dropping one or more occasions for the semi-persistent resource based on switching to the second bandwidth part for the temporary duration.

In some examples, the semi-persistent resource deactivation component 1050 may be configured as or otherwise support a means for deactivating the semi-persistent resource for the temporary duration based on switching to the second bandwidth part.

In some examples, the semi-persistent communications component 1040 may be configured as or otherwise support a means for receiving an uplink message via an occasion of the semi-persistent resource, where the semi-persistent resource is a configured grant resource.

In some examples, the semi-persistent communications component 1040 may be configured as or otherwise support a means for transmitting a downlink message via an occasion of the semi-persistent resource, where the semi-persistent resource is a SPS resource.

In some examples, the temporary duration is a quantity of slots, a quantity of symbols, or a quantity of time, or any combination thereof.

In some examples, the temporary duration is based on a first configuration for the first bandwidth part or a second configuration for the second bandwidth part, or both.

Figure 11:
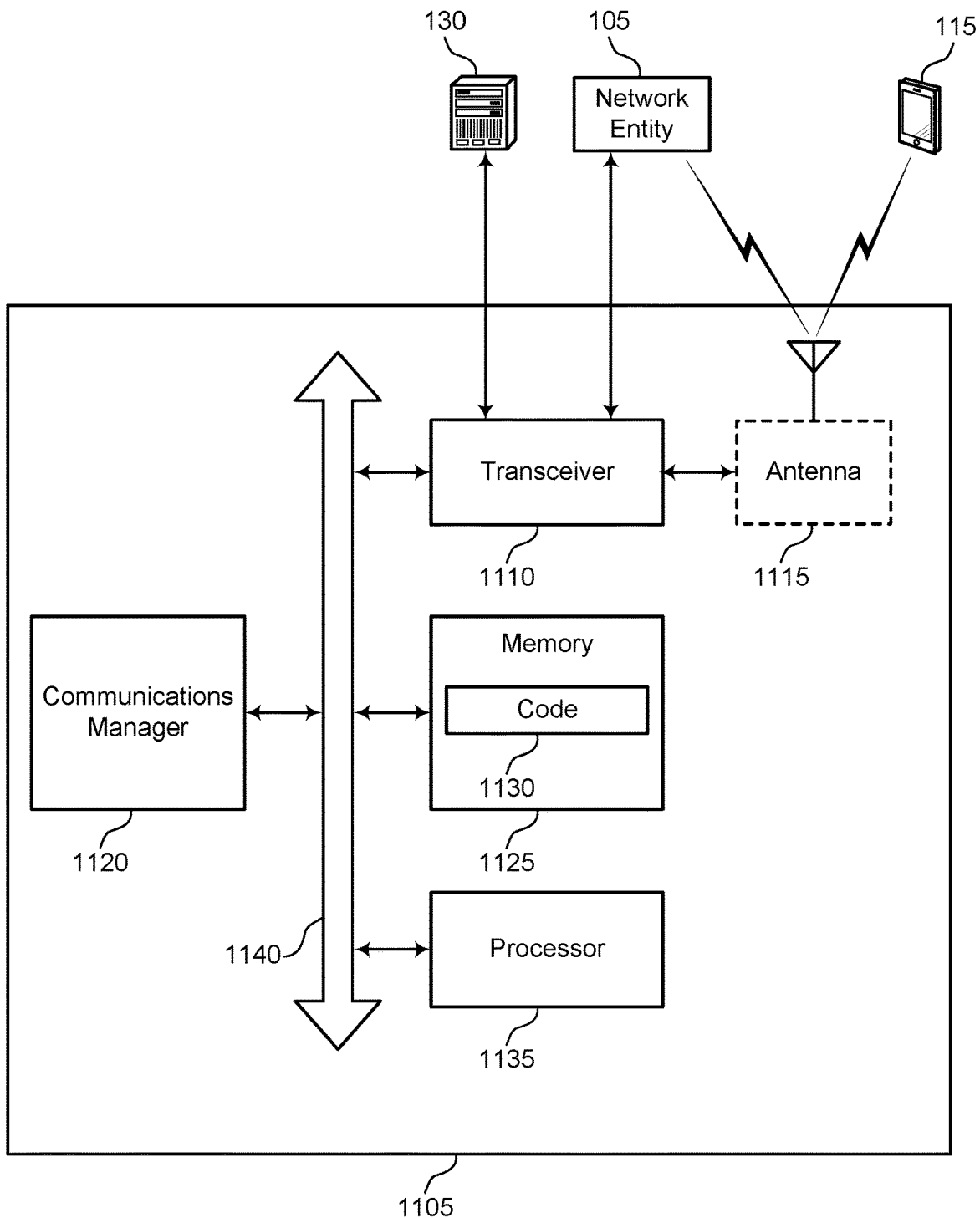
FIG. 11 shows a diagram of a system including a device that supports deactivation of SPS and configured grant resources during temporary bandwidth part switching in accordance with one or more aspects of the present disclosure.

FIG. 11 shows a diagram of a system including a device 1105 that supports deactivation of SPS and configured grant resources during temporary bandwidth part switching in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (for example, operatively, communicatively, functionally, electronically, electrically) via one or more buses (for example, a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (for example, concurrently). The transceiver 1110 may also include a modem to modulate signals, to provide the modulated signals for transmission (for example, by one or more antennas 1115, by a wired transmitter), to receive modulated signals (for example, from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (for example, a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (for example, when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (for example, a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (for example, the memory 1125) to cause the device 1105 to perform various functions (for example, functions or tasks supporting deactivation of SPS and configured grant resources during temporary bandwidth part switching). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (for example, one or more physical nodes and supporting software such as operating systems, virtual machines, or container instances) that may host the functions (for example, by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (for example, within) a protocol layer of a protocol stack. In some examples, a bus 1140 may support communications associated with a logical channel of a protocol stack (for example, between protocol layers of a protocol stack), which may include communications performed within a component of the device 1105, or between different components of the device 1105 that may be co-located or located in different locations (for example, where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (for example, via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a network entity in accordance with examples as disclosed herein. For example, the communications manager 1120 may be configured as or otherwise support a means for transmitting, via a first bandwidth part, a first DCI message activating a semi-persistent resource for the first bandwidth part. The communications manager 1120 may be configured as or otherwise support a means for switching to a second bandwidth part from the first bandwidth part for a temporary duration. The communications manager 1120 may be configured as or otherwise support a means for delaying, based on switching to the second bandwidth part, communications via the semi-persistent resource on the first bandwidth part for the temporary duration without transmitting a second DCI message via the first bandwidth part that deactivates or releases the semi-persistent resource.

By including or configuring the communications manager 1120 in accordance with examples as described herein, the device 1105 may support techniques for reduced overhead and reduced power consumption. For example, the device 1105 may be configured to drop or delay communications for a semi-persistent resource while a UE 115 configured with the semi-persistent resource is temporarily switched to a different bandwidth part without transmitting signaling configuring the UE 115 to deactivate or release the semi-persistent resource, reducing overhead. Similarly, the device 1105 may be supported to resume communications for the semi-persistent resource after the temporary bandwidth part switch without transmitting signaling configuring the UE 115 to resume or reactivate the semi-persistent resource, further reducing signaling overhead and power consumption to generate and transmit the signaling. Additionally, these techniques may enable network-side power savings, where the device 805 may switch between configurations to reduce power consumption.

In some examples, the communications manager 1120 may be configured to perform various operations (for example, receiving, obtaining, monitoring, outputting, transmitting) using or otherwise in cooperation with the transceiver 1110, the one or more antennas 1115 (for example, where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of deactivation of SPS and configured grant resources during temporary bandwidth part switching as described herein, or the processor 1135 and the memory 1125 may be otherwise configured to perform or support such operations.

Figure 12:
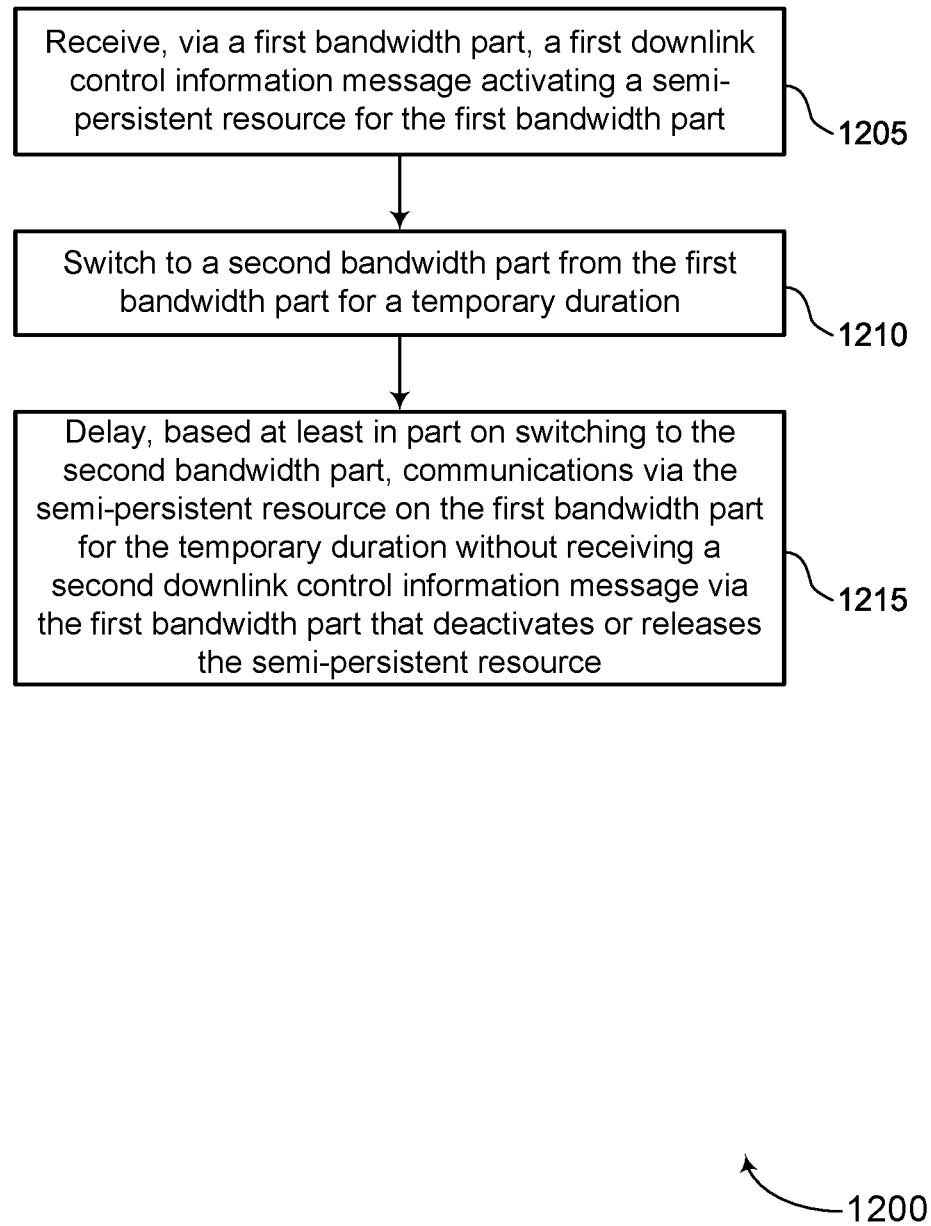
FIGS. 12-15 show flowcharts illustrating methods that support deactivation of SPS and configured grant resources during temporary bandwidth part switching in accordance with one or more aspects of the present disclosure.

FIG. 12 shows a flowchart illustrating a method 1200 that supports deactivation of SPS and configured grant resources during temporary bandwidth part switching in accordance with one or more aspects of the present disclosure. The operations of the method 1200 may be implemented by a UE or its components as described herein. For example, the operations of the method 1200 may be performed by a UE 115 as described with reference to FIGS. 1-7. In some examples, a UE may execute a set of instructions to control the functional elements of the UE to perform the described functions. Additionally, or alternatively, the UE may perform aspects of the described functions using special-purpose hardware.

At 1205, the method may include receiving, via a first bandwidth part, a first DCI message activating a semi-persistent resource for the first bandwidth part. The operations of 1205 may be performed in accordance with examples as disclosed herein. In some examples, aspects of the operations of 1205 may be performed by a semi-persistent resource configuration component 625 as described with reference to FIG. 6.

At 1210, the method may include switching to a second bandwidth part from the first bandwidth part for a temporary duration. The operations of 1210 may be performed in accordance with examples as disclosed herein. In some examples, aspects of the operations of 1210 may be performed by a BWP switching component 630 as described with reference to FIG. 6.

At 1215, the method may include delaying, based on switching to the second bandwidth part, communications via the semi-persistent resource on the first bandwidth part for the temporary duration without receiving a second DCI message via the first bandwidth part that deactivates or releases the semi-persistent resource. The operations of 1215 may be performed in accordance with examples as disclosed herein. In some examples, aspects of the operations of 1215 may be performed by a semi-persistent communications delaying component 635 as described with reference to FIG. 6.

Figure 13:
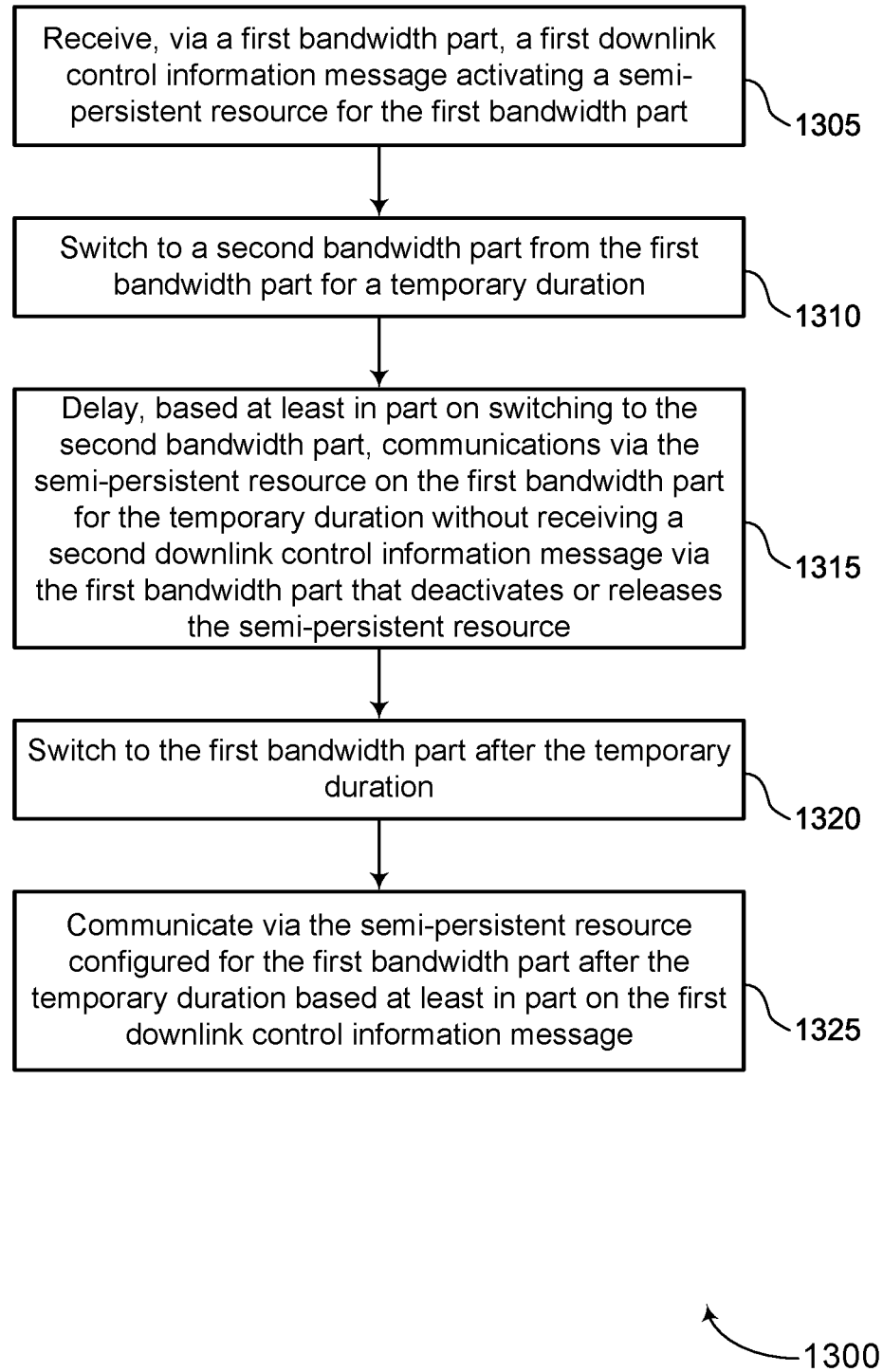

FIG. 13 shows a flowchart illustrating a method 1300 that supports deactivation of SPS and configured grant resources during temporary bandwidth part switching in accordance with one or more aspects of the present disclosure. The operations of the method 1300 may be implemented by a UE or its components as described herein. For example, the operations of the method 1300 may be performed by a UE 115 as described with reference to FIGS. 1-7. In some examples, a UE may execute a set of instructions to control the functional elements of the UE to perform the described functions. Additionally, or alternatively, the UE may perform aspects of the described functions using special-purpose hardware.

At 1305, the method may include receiving, via a first bandwidth part, a first DCI message activating a semi-persistent resource for the first bandwidth part. The operations of 1305 may be performed in accordance with examples as disclosed herein. In some examples, aspects of the operations of 1305 may be performed by a semi-persistent resource configuration component 625 as described with reference to FIG. 6.

At 1310, the method may include switching to a second bandwidth part from the first bandwidth part for a temporary duration. The operations of 1310 may be performed in accordance with examples as disclosed herein. In some examples, aspects of the operations of 1310 may be performed by a BWP switching component 630 as described with reference to FIG. 6.

At 1315, the method may include delaying, based on switching to the second bandwidth part, communications via the semi-persistent resource on the first bandwidth part for the temporary duration without receiving a second DCI message via the first bandwidth part that deactivates or releases the semi-persistent resource. The operations of 1315 may be performed in accordance with examples as disclosed herein. In some examples, aspects of the operations of 1315 may be performed by a semi-persistent communications delaying component 635 as described with reference to FIG. 6.

At 1320, the method may include switching to the first bandwidth part after the temporary duration. The operations of 1320 may be performed in accordance with examples as disclosed herein. In some examples, aspects of the operations of 1320 may be performed by a BWP switching component 630 as described with reference to FIG. 6.

At 1325, the method may include communicating via the semi-persistent resource configured for the first bandwidth part after the temporary duration based on the first DCI message. The operations of 1325 may be performed in accordance with examples as disclosed herein. In some examples, aspects of the operations of 1325 may be performed by a semi-persistent communications component 640 as described with reference to FIG. 6.

Figure 14:
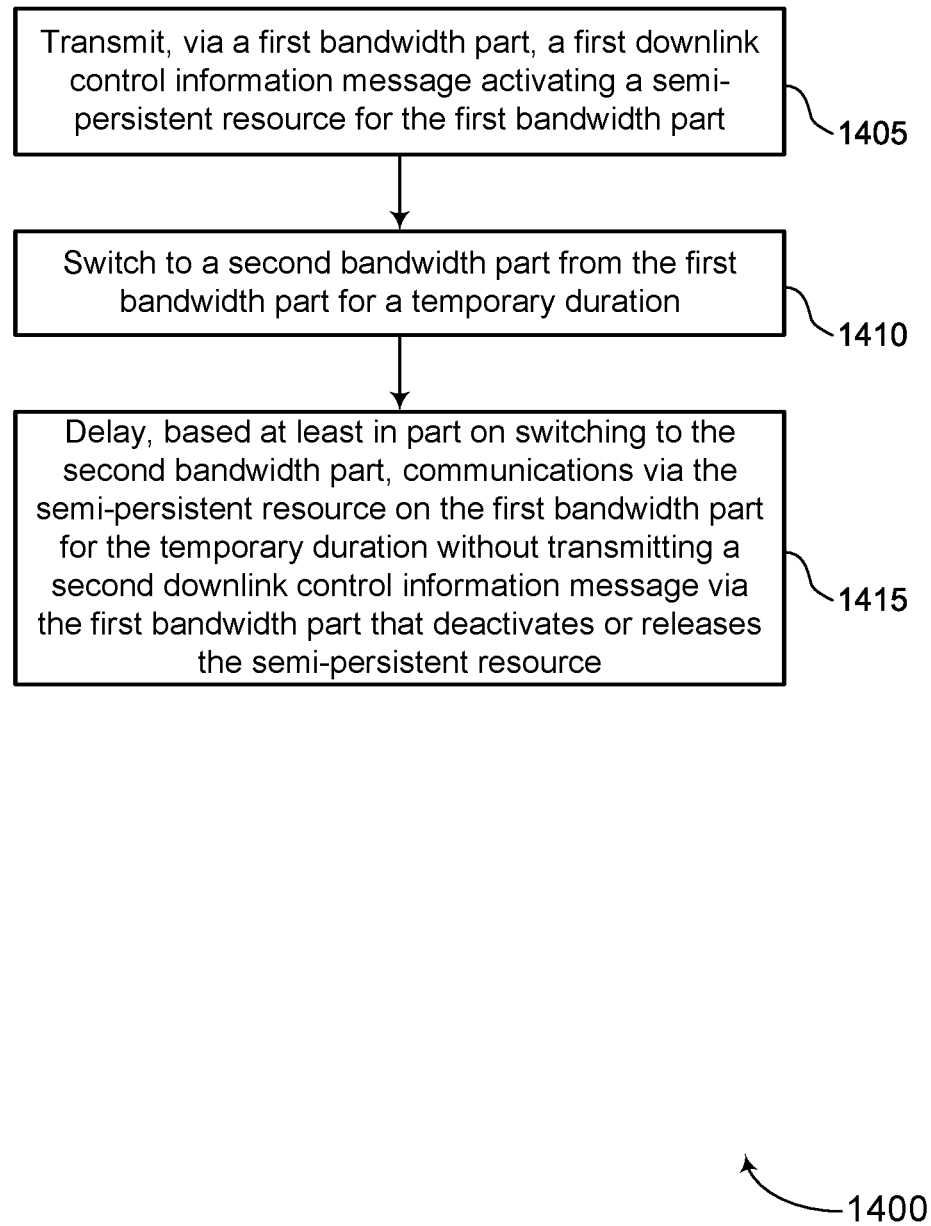

FIG. 14 shows a flowchart illustrating a method 1400 that supports deactivation of SPS and configured grant resources during temporary bandwidth part switching in accordance with one or more aspects of the present disclosure. The operations of the method 1400 may be implemented by a network entity or its components as described herein. For example, the operations of the method 1400 may be performed by a network entity as described with reference to FIGS. 1-3 and 8-11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, via a first bandwidth part, a first DCI message activating a semi-persistent resource for the first bandwidth part. The operations of 1405 may be performed in accordance with examples as disclosed herein. In some examples, aspects of the operations of 1405 may be performed by a semi-persistent resource configuring message 1025 as described with reference to FIG. 10.

At 1410, the method may include switching to a second bandwidth part from the first bandwidth part for a temporary duration. The operations of 1410 may be performed in accordance with examples as disclosed herein. In some examples, aspects of the operations of 1410 may be performed by a BWP switching component 1030 as described with reference to FIG. 10.

At 1415, the method may include delaying, based on switching to the second bandwidth part, communications via the semi-persistent resource on the first bandwidth part for the temporary duration without transmitting a second DCI message via the first bandwidth part that deactivates or releases the semi-persistent resource. The operations of 1415 may be performed in accordance with examples as disclosed herein. In some examples, aspects of the operations of 1415 may be performed by a semi-persistent communications delaying component 1035 as described with reference to FIG. 10.

Figure 15:
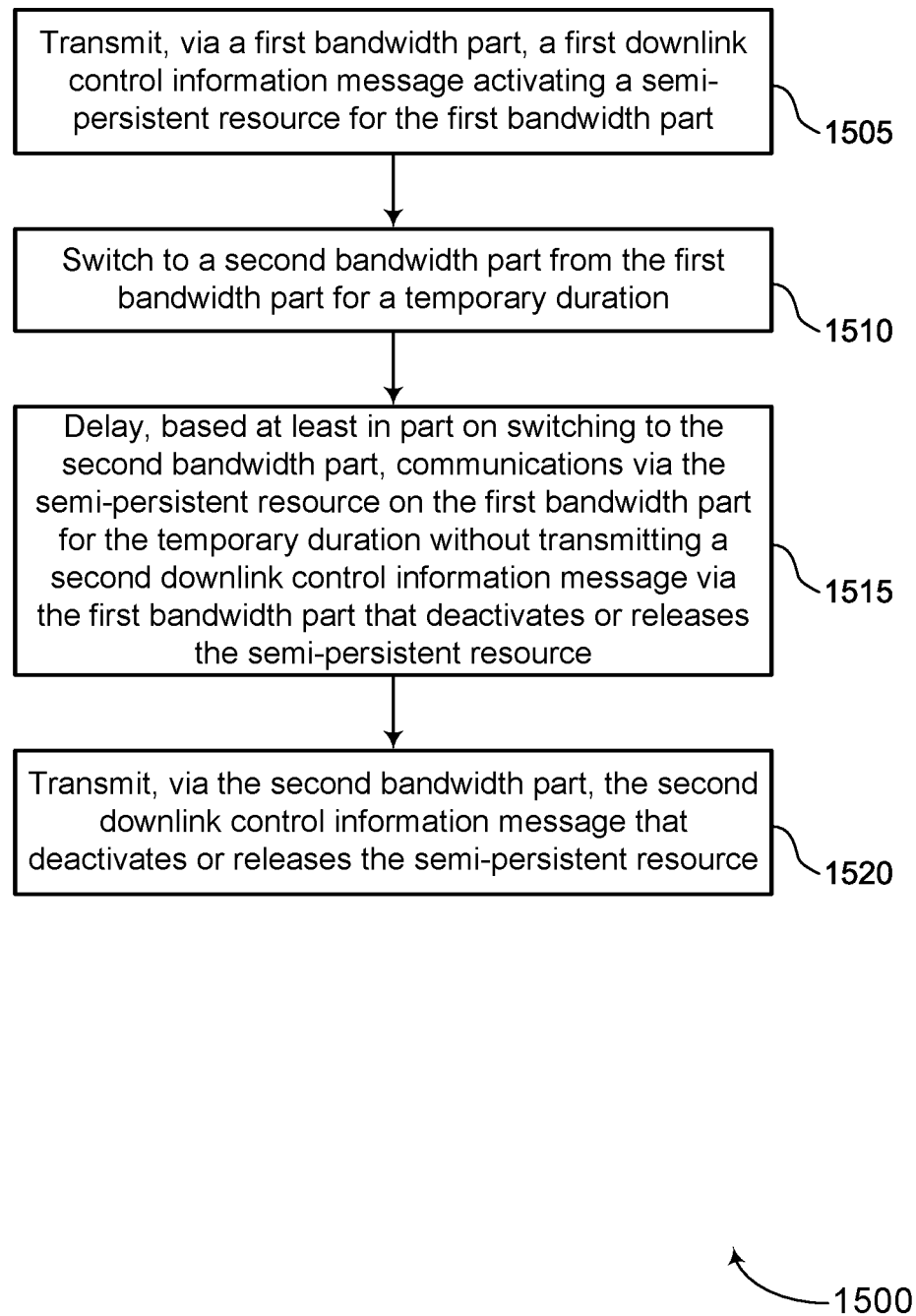

FIG. 15 shows a flowchart illustrating a method 1500 that supports deactivation of SPS and configured grant resources during temporary bandwidth part switching in accordance with one or more aspects of the present disclosure. The operations of the method 1500 may be implemented by a network entity or its components as described herein. For example, the operations of the method 1500 may be performed by a network entity as described with reference to FIGS. 1-3 and 8-11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, via a first bandwidth part, a first DCI message activating a semi-persistent resource for the first bandwidth part. The operations of 1505 may be performed in accordance with examples as disclosed herein. In some examples, aspects of the operations of 1505 may be performed by a semi-persistent resource configuring message 1025 as described with reference to FIG. 10.

At 1510, the method may include switching to a second bandwidth part from the first bandwidth part for a temporary duration. The operations of 1510 may be performed in accordance with examples as disclosed herein. In some examples, aspects of the operations of 1510 may be performed by a BWP switching component 1030 as described with reference to FIG. 10.

At 1515, the method may include delaying, based on switching to the second bandwidth part, communications via the semi-persistent resource on the first bandwidth part for the temporary duration without transmitting a second DCI message via the first bandwidth part that deactivates or releases the semi-persistent resource. The operations of 1515 may be performed in accordance with examples as disclosed herein. In some examples, aspects of the operations of 1515 may be performed by a semi-persistent communications delaying component 1035 as described with reference to FIG. 10.

At 1520, the method may include transmitting, via the second bandwidth part, the second DCI message that deactivates or releases the semi-persistent resource. The operations of 1520 may be performed in accordance with examples as disclosed herein. In some examples, aspects of the operations of 1520 may be performed by a semi-persistent resource deactivation component 1050 as described with reference to FIG. 10.

The following provides an overview of aspects of the present disclosure:

Aspect 1: A method for wireless communications at a UE, comprising: receiving, via a first bandwidth part, a first downlink control information message activating a semi-persistent resource for the first bandwidth part; switching to a second bandwidth part from the first bandwidth part for a temporary duration; and delaying, based at least in part on switching to the second bandwidth part, communications via the semi-persistent resource on the first bandwidth part for the temporary duration without receiving a second downlink control information message via the first bandwidth part that deactivates or releases the semi-persistent resource.

Aspect 2: The method of aspect 1, further comprising: switching to the first bandwidth part after the temporary duration; and communicating via the semi-persistent resource configured for the first bandwidth part after the temporary duration based at least in part on the first downlink control information message.

Aspect 3: The method of aspect 2, wherein communicating via the semi-persistent resource after the temporary duration occurs without receiving an additional downlink control information message activating the semi-persistent resource.

Aspect 4: The method of any of aspects 1 through 3, further comprising: receiving a control message indicating to switch to the second bandwidth part for the temporary duration, wherein switching to the second bandwidth part is based at least in part on the control message.

Aspect 5: The method of aspect 4, wherein the control message indicates a quantity of slots for the temporary duration or a timer for the temporary duration.

Aspect 6: The method of any of aspects 1 through 5, further comprising: receiving, via the second bandwidth part, the second downlink control information message that deactivates or releases the semi-persistent resource.

Aspect 7: The method of aspect 6, wherein the second downlink control information message includes an identifier of the semi-persistent resource, or the first bandwidth part, or both.

Aspect 8: The method of any of aspects 1 through 7, further comprising: receiving, via the second bandwidth part during the temporary duration, an activation downlink control information message for a second semi-persistent resource for the first bandwidth part Aspect 9: The method of aspect 8, further comprising: switching to the first bandwidth part after the temporary duration; and communicating via the second semi-persistent resource configured for the first bandwidth part after the temporary duration based at least in part on the activation downlink control information message Aspect 10: The method of any of aspects 1 through 9, further comprising: dropping one or more occasions for the semi-persistent resource based at least in part on switching to the second bandwidth part for the temporary duration.

Aspect 11: The method of any of aspects 1 through 10, further comprising: deactivating the semi-persistent resource for the temporary duration based at least in part on switching to the second bandwidth part.

Aspect 12: The method of any of aspects 1 through 11, further comprising: transmitting an uplink message via an occasion of the semi-persistent resource, wherein the semi-persistent resource is a configured grant resource.

Aspect 13: The method of any of aspects 1 through 12, further comprising: receiving a downlink message via an occasion of the semi-persistent resource, wherein the semi-persistent resource is a semi-persistent scheduling resource.

Aspect 14: The method of any of aspects 1 through 13, wherein the temporary duration is a quantity of slots, a quantity of symbols, or a quantity of time, or any combination thereof.

Aspect 15: The method of any of aspects 1 through 14, wherein the temporary duration is based at least in part on a first configuration for the first bandwidth part, or a second configuration for the second bandwidth part, or both.

Aspect 16: A method for wireless communications at a network entity, comprising: transmitting, via a first bandwidth part, a first downlink control information message activating a semi-persistent resource for the first bandwidth part; switching to a second bandwidth part from the first bandwidth part for a temporary duration; and delaying, based at least in part on switching to the second bandwidth part, communications via the semi-persistent resource on the first bandwidth part for the temporary duration without transmitting a second downlink control information message via the first bandwidth part that deactivates or releases the semi-persistent resource.

Aspect 17: The method of aspect 16, further comprising: switching to the first bandwidth part after the temporary duration; and communicating via the semi-persistent resource configured for the first bandwidth part after the temporary duration based at least in part on the first downlink control information message.

Aspect 18: The method of aspect 17, wherein communicating via the semi-persistent resource after the temporary duration occurs without transmitting an additional downlink control information message activating the semi-persistent resource.

Aspect 19: The method of any of aspects 16 through 18, further comprising: transmitting a control message indicating to switch to the second bandwidth part for the temporary duration, wherein switching to the second bandwidth part is based at least in part on the control message.

Aspect 20: The method of aspect 19, wherein the control message indicates a quantity of slots for the temporary duration or a timer for the temporary duration.

Aspect 21: The method of any of aspects 16 through 20, further comprising: transmitting, via the second bandwidth part, the second downlink control information message that deactivates or releases the semi-persistent resource.

Aspect 22: The method of aspect 21, wherein the second downlink control information message includes an identifier of the semi-persistent resource or the first bandwidth part, or both.

Aspect 23: The method of any of aspects 16 through 22, further comprising: dropping one or more occasions for the semi-persistent resource based at least in part on switching to the second bandwidth part for the temporary duration.

Aspect 24: The method of any of aspects 16 through 23, further comprising: deactivating the semi-persistent resource for the temporary duration based at least in part on switching to the second bandwidth part.

Aspect 25: The method of any of aspects 16 through 24, further comprising: receiving an uplink message via an occasion of the semi-persistent resource, wherein the semi-persistent resource is a configured grant resource.

Aspect 26: The method of any of aspects 16 through 25, further comprising: transmitting a downlink message via an occasion of the semi-persistent resource, wherein the semi-persistent resource is a semi-persistent scheduling resource.

Aspect 27: The method of any of aspects 16 through 26, wherein the temporary duration is a quantity of slots, a quantity of symbols, or a quantity of time, or any combination thereof.

Aspect 28: The method of any of aspects 16 through 27, wherein the temporary duration is based at least in part on a first configuration for the first bandwidth part or a second configuration for the second bandwidth part, or both.

Aspect 29: An apparatus for wireless communications at a UE, comprising a processor; and memory coupled with the processor and storing instructions executable by the processor to cause the apparatus to perform a method of any of aspects 1 through 15.

Aspect 30: An apparatus for wireless communications at a UE, comprising at least one means for performing a method of any of aspects 1 through 15.

Aspect 31: A non-transitory computer-readable medium storing code for wireless communications at a UE, the code comprising instructions executable by a processor to perform a method of any of aspects 1 through 15.

Aspect 32: An apparatus for wireless communications at a network entity, comprising a processor; and memory coupled with the processor and storing instructions executable by the processor to cause the apparatus to perform a method of any of aspects 16 through 28.

Aspect 33: An apparatus for wireless communications at a network entity, comprising at least one means for performing a method of any of aspects 16 through 28.

Aspect 34: A non-transitory computer-readable medium storing code for wireless communications at a network entity, the code comprising instructions executable by a processor to perform a method of any of aspects 16 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (for example, receiving information), accessing (for example, accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   at least one processor; and
   at least one memory coupled with the at least one processor and storing instructions executable by the at least one processor to cause the apparatus to:
   receive, via a first bandwidth part associated with communicating via a first power configuration, a first downlink control information message that activates a first semi-persistent resource in the first bandwidth part;
   switch to a second bandwidth part from the first bandwidth part for a temporary duration, the second bandwidth part being associated with communicating via a second power configuration that is different than the first power configuration;
   delay, based at least in part on switching to the second bandwidth part, communications via the first semi-persistent resource in the first bandwidth part for at Least the temporary duration without receiving a second downlink control information message via the first bandwidth part that deactivates or releases the first semi-persistent resource; and
   receive, via the second bandwidth part during the temporary duration, a third downlink control information message that activates a second semi-persistent resource in the first bandwidth part.

2. The apparatus of claim 1, wherein the instructions are further executable by the at least one processor to cause the apparatus to:
   switch to the first bandwidth part after the temporary duration; and
   communicate via the first semi-persistent resource configured in the first bandwidth part after the temporary duration based at least in part on the first downlink control information message.

3. The apparatus of claim 2, wherein communicating via the first semi-persistent resource after the temporary duration occurs without receiving an additional downlink control information message that activates the first semi-persistent resource.

4. The apparatus of claim 1, wherein the instructions are further executable by the at least one processor to cause the apparatus to receive a control message indicating to switch to the second bandwidth part for at least the temporary duration, wherein switching to the second bandwidth part is based at least in part on the control message.

5. The apparatus of claim 4, wherein the control message indicates a quantity of slots for the temporary duration or a timer for the temporary duration.

6. The apparatus of claim 1, wherein the instructions are further executable by the at least one processor to cause the apparatus to receive, via the second bandwidth part, the second downlink control information message that deactivates or releases the first semi-persistent resource.

7. The apparatus of claim 6, wherein the second downlink control information message includes an identifier of the first semi-persistent resource, or the first bandwidth part, or both.

8. The apparatus of claim 1, wherein the instructions are further executable by the at least one processor to cause the apparatus to:
   switch to the first bandwidth part after the temporary duration; and communicate via the second semi-persistent resource in the first bandwidth part after the temporary duration based at least in part on the third downlink control information message.

9. The apparatus of claim 1, wherein the instructions are further executable by the at least one processor to cause the apparatus to drop one or more occasions for the first semi-persistent resource based at least in part on switching to the second bandwidth part for at least the temporary duration.

10. The apparatus of claim 1, wherein the instructions are further executable by the at least one processor to cause the apparatus to deactivate the first semi-persistent resource for at least the temporary duration based at least in part on switching to the second bandwidth part.

11. The apparatus of claim 1, wherein the instructions are further executable by the at least one processor to cause the apparatus to transmit an uplink message via an occasion of the first semi-persistent resource, wherein the first semi-persistent resource is a configured grant resource.

12. The apparatus of claim 1, wherein the instructions are further executable by the at least one processor to cause the apparatus to receive a downlink message via an occasion of the first semi-persistent resource, wherein the first semi-persistent resource is a semi-persistent scheduling resource.

13. The apparatus of claim 1, wherein the temporary duration is a quantity of slots, a quantity of symbols, or a quantity of time, or any combination thereof.

14. The apparatus of claim 1, wherein the temporary duration is based at least in part on a first configuration for the first bandwidth part, or a second configuration for the second bandwidth part, or both.

15. An apparatus for wireless communications at a network entity, comprising:
at least one processor; and
at least one memory coupled with the at least one processor and storing instructions executable by the at least one processor to cause the apparatus to:
transmit, via a first bandwidth part associated with communicating via a first power configuration, a first downlink control information message that activates a first semi-persistent resource in the first bandwidth part;
switch to a second bandwidth part from the first bandwidth part for a temporary duration, the second bandwidth part being associated with communicating via a second power configuration that is different than the first power configuration;
delay, based at least in part on switching to the second bandwidth part, communications via the first semi-persistent resource in the first bandwidth part for at least the temporary duration without transmitting a second downlink control information message via the first bandwidth part that deactivates or releases the first semi-persistent resource; and
transmit, via the second bandwidth part during the temporary duration, a third downlink control information message that activates a second semi-persistent resource in the first bandwidth part.

16. The apparatus of claim 15, wherein the instructions are further executable by the at least one processor to cause the apparatus to:
switch to the first bandwidth part after the temporary duration; and
communicate via the first semi-persistent resource configured in the first bandwidth part after the temporary duration based at least in part on the first downlink control information message.

17. The apparatus of claim 16, wherein communicating via the first semi-persistent resource after the temporary duration occurs without transmitting an additional downlink control information message that activates the first semi-persistent resource.

18. The apparatus of claim 15, wherein the instructions are further executable by the at least one processor to cause the apparatus to transmit a control message indicating to switch to the second bandwidth part for at least the temporary duration, wherein switching to the second bandwidth part is based at least in part on the control message.

19. The apparatus of claim 18, wherein the control message indicates a quantity of slots for the temporary duration or a timer for the temporary duration.

20. The apparatus of claim 15, wherein the instructions are further executable by the at least one processor to cause the apparatus to transmit, via the second bandwidth part, the second downlink control information message that deactivates or releases the first semi-persistent resource.

21. The apparatus of claim 20, wherein the second downlink control information message includes an identifier of the first semi-persistent resource or the first bandwidth part, or both.

22. The apparatus of claim 15, wherein the instructions are further executable by the at least one processor to cause the apparatus to drop one or more occasions for the first semi-persistent resource based at least in part on switching to the second bandwidth part for at least the temporary duration.

23. The apparatus of claim 15, wherein the instructions are further executable by the at least one processor to cause the apparatus to deactivate the first semi-persistent resource for at least the temporary duration based at least in part on switching to the second bandwidth part.

24. The apparatus of claim 15, wherein the instructions are further executable by the at least one processor to cause the apparatus to receive an uplink message via an occasion of the first semi-persistent resource, wherein the first semi-persistent resource is a configured grant resource.

25. The apparatus of claim 15, wherein the instructions are further executable by the at least one processor to cause the apparatus to transmit a downlink message via an occasion of the first semi-persistent resource, wherein the first semi-persistent resource is a semi-persistent scheduling resource.

26. The apparatus of claim 15, wherein the temporary duration is a quantity of slots, a quantity of symbols, or a quantity of time, or any combination thereof.

27. The apparatus of claim 15, wherein the temporary duration is based at least in part on a first configuration for the first bandwidth part or a second configuration for the second bandwidth part, or both.

28. A method for wireless communications at a user equipment (UE), comprising:
receiving, via a first bandwidth part associated with communicating via a first power configuration, a first downlink control information message that activates a first semi-persistent resource in the first bandwidth part;
switching to a second bandwidth part from the first bandwidth part for a temporary duration, the second bandwidth part being associated with communicating via a second power configuration that is different than the first power configuration;
delaying, based at least in part on switching to the second bandwidth part, communications via the first semi-persistent resource in the first bandwidth part for at least the temporary duration without receiving a second downlink control information message via the first bandwidth part that deactivates or releases the first semi-persistent resource; and receiving, via the second bandwidth part during the temporary duration, a third downlink control information message that activates a second semi-persistent resource in the first bandwidth part.

29. A method for wireless communications at a network entity, comprising:

transmitting, via a first bandwidth part associated with communicating via a first power configuration, a first downlink control information message that activates a first semi-persistent resource in the first bandwidth part;

switching to a second bandwidth part from the first bandwidth part for a temporary duration, the second bandwidth part being associated with communicating via a second power configuration that is different than the first power configuration;

delaying, based at least in part on switching to the second bandwidth part, communications via the first semi-persistent resource in the first bandwidth part for the temporary duration without transmitting a second downlink control information message via the first bandwidth part that deactivates or releases the first semi-persistent resource; and transmitting, via the second bandwidth part during the temporary duration, a third downlink control information message that activates a second semi-persistent resource in the first bandwidth part.

\* \* \* \* \*